United States Patent
Lee et al.

(10) Patent No.: US 12,314,101 B2
(45) Date of Patent: May 27, 2025

(54) DEVICE AND METHOD FOR RESTORING APPLICATION REMOVED BY FACTORY DATA RESET FUNCTION

(71) Applicant: Samsung Electronics Co., Ltd., Suwon-si (KR)

(72) Inventors: Eunsung Lee, Suwon-si (KR); Changhoon Shin, Suwon-si (KR); Hakryoul Kim, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 17/250,509

(22) PCT Filed: May 23, 2019

(86) PCT No.: PCT/KR2019/006198
§ 371 (c)(1),
(2) Date: Jan. 29, 2021

(87) PCT Pub. No.: WO2020/027413
PCT Pub. Date: Feb. 6, 2020

(65) Prior Publication Data
US 2021/0325948 A1    Oct. 21, 2021

(30) Foreign Application Priority Data
Jul. 31, 2018    (KR) .................... 10-2018-0089521

(51) Int. Cl.
*G06F 1/24* (2006.01)
*G06F 3/06* (2006.01)
(Continued)

(52) U.S. Cl.
CPC .............. *G06F 1/24* (2013.01); *G06F 3/0619* (2013.01); *G06F 3/0644* (2013.01);
(Continued)

(58) Field of Classification Search
CPC ........ G06F 1/24; G06F 3/0619; G06F 3/0644; G06F 3/0647; G06F 3/0652;
(Continued)

(56) References Cited

U.S. PATENT DOCUMENTS 7,915,910 B2 * 3/2011 von Kaenel ............ G06F 1/324
326/16
9,280,483 B1 * 3/2016 Ghoshal ............ H04M 1/72406
(Continued)

FOREIGN PATENT DOCUMENTS

CN 105843710 A 8/2016
JP 2005-149135 A 6/2005
(Continued)

OTHER PUBLICATIONS

Android Central, Why won't my phone factory reset?, Mar. 4, 2016, pp. 1-7 (Year: 2016).*
(Continued)

*Primary Examiner* — Aurel Prifti

(57) ABSTRACT

In electronic devices according to various embodiments, after a partition in which one or more applications are installed is reset by a factory data reset function, the one or more applications installed in the partition can be installed on the basis of a backup file. When the factory data reset function is not requested by a user who has purchased an electronic device, for example, when an inspector of the electronic device requests the factory data reset function or the factory data reset function is requested on the basis of the SIM card that was first inserted into the electronic device, the restoration of the one or more applications using the backup file can be performed by the electronic device.

16 Claims, 24 Drawing Sheets

(51) Int. Cl.
  *G06F 8/61* (2018.01)
  *G06F 9/4401* (2018.01)
  *G06F 3/04842* (2022.01)
  *G06F 3/04847* (2022.01)
(52) U.S. Cl.
  CPC .......... *G06F 3/0647* (2013.01); *G06F 3/0652* (2013.01); *G06F 3/0659* (2013.01); *G06F 3/0673* (2013.01); *G06F 8/61* (2013.01); *G06F 9/4401* (2013.01); *G06F 3/04842* (2013.01); *G06F 3/04847* (2013.01)
(58) Field of Classification Search
  CPC ........ G06F 3/0659; G06F 3/0673; G06F 8/61; G06F 9/4401; G06F 3/04842; G06F 3/04847
  See application file for complete search history.

(56) References Cited

U.S. PATENT DOCUMENTS

| | | | |
|---|---|---|---|
| 10,067,692 B2 | 9/2018 | Liu et al. | |
| 2008/0120353 A1 | 5/2008 | Kwon | |
| 2008/0177994 A1* | 7/2008 | Mayer | G06F 16/00 |
| | | | 709/224 |
| 2010/0223498 A1* | 9/2010 | Schlesinger | G06F 11/1482 |
| | | | 714/15 |
| 2010/0293361 A1* | 11/2010 | Shibata | G06F 1/24 |
| | | | 713/1 |
| 2012/0311279 A1* | 12/2012 | Hong | G06F 11/1461 |
| | | | 711/E12.103 |
| 2013/0179403 A1 | 7/2013 | Kim et al. | |
| 2013/0290949 A1 | 10/2013 | Lee et al. | |
| 2014/0282007 A1* | 9/2014 | Fleizach | G06F 9/453 |
| | | | 715/728 |
| 2014/0372743 A1* | 12/2014 | Rogers | H04L 9/088 |
| | | | 713/155 |
| 2015/0161616 A1* | 6/2015 | Brunet | G06F 1/24 |
| | | | 707/738 |
| 2016/0196145 A1* | 7/2016 | Liverance | G06F 1/24 |
| | | | 713/2 |
| 2017/0038989 A1 | 2/2017 | Seo et al. | |
| 2020/0154389 A1* | 5/2020 | Karampatsis | H04L 63/20 |
| 2021/0149578 A1* | 5/2021 | Xu | H04L 41/0806 |
| 2021/0397752 A1* | 12/2021 | Li | G06F 21/84 |

FOREIGN PATENT DOCUMENTS

| | | |
|---|---|---|
| JP | 2016524752 A | 8/2016 |
| KR | 10-2008-0041383 A | 5/2008 |
| KR | 10-2009-0114974 A | 11/2009 |
| KR | 10-1181758 B1 | 9/2012 |
| KR | 10-2013-0081417 A | 7/2013 |
| KR | 10-1342914 B1 | 12/2013 |
| KR | 10-2017-0017516 A | 2/2017 |
| KR | 20170136115 A | 12/2017 |

OTHER PUBLICATIONS

Why won't my phone factory reset from Android Central, 2016 (Year: 2016).*
International Search Report dated Sep. 9, 2019 in connection with International Patent Application No. PCT/KR2019/006198, 2 pages.
Written Opinion of the International Searching Authority dated Sep. 9, 2019 in connection with International Patent Application No. PCT/KR2019/006198, 5 pages.
Notice of Preliminary Rejection dated May 13, 2024, in connection with Korean Application No. 10-2018-0089521, 11 pages.
Notice of Patent Grant issued Jan. 15, 2025, in connection with Korean Patent Application No. 10-2018-0089521, 5 pages.
Notice of Final Rejection dated Oct. 30, 2024, in connection with Korean Application No. 10-2018-0089521, 6 pages.

* cited by examiner

DEVICE AND METHOD FOR RESTORING APPLICATION REMOVED BY FACTORY DATA RESET FUNCTION

CROSS-REFERENCE TO RELATED APPLICATIONS

This application is a 371 of International Application No. PCT/KR2019/006198 filed on May 23, 2019, which claims priority to Korean Patent Application No. 10-2018-0089521 filed on Jul. 31, 2018, the disclosures of which are herein incorporated by reference in their entirety.

BACKGROUND

1. Field

Various embodiments described below relate to an electronic device supporting a factory data reset function and a method thereof.

2. Description of Related Art

An electronic device may support a factory data reset (FDR) function, which initializes the state of the electronic device (for example, data, account information, or the like stored in the electronic device) to a designated timepoint (for example, a timepoint at which the user initially turns on the electronic device). The factor data reset function may not only be performed by a consumer, but also be performed at a timepoint unintended by the consumer (for example, when the electronic device is tested by the manufacturer or network administrator, or when the electronic device is initially connected to a network).

The factory data reset function may be performed by formatting at least one designated partition by means of the operating system. If the manufacturer of the electronic device has installed an application in a partition formatted by the factory data reset function, the installed application may be removed by the factory data reset function performed before the consumer of the electronic device uses the electronic device. In this case, the application installed by the manufacturer of the electronic device may not be delivered to the consumer of the electronic device.

An electronic device according to various embodiments may restore at least one application by using a backup file in response to the factory data reset function performed before the consumer of the electronic device uses the electronic device, thereby protecting the application.

The technical subjects pursued in the disclosure may not be limited to the above-mentioned technical subjects, and other technical subjects which are not mentioned may be clearly understood, through the following descriptions, by those skilled in the art to which the disclosure pertains.

SUMMARY

An electronic device according to various embodiments may include: a user interface; a memory including at least one application, a first partition including a backup file obtained by compressing the application, and a second partition distinguished from the first partition; and a processor electrically connected to the user interface and the memory. The memory may store instructions that allow the processor to: receive a first input requesting a factory data reset through the user interface; move the backup file to the second partition in response to the first input; delete the data in the first partition after the movement; and install the at least one application on the first partition by using the backup file, while the electronic device is rebooting.

An electronic device according to various embodiments may include: a memory; and a processor operatively connected to the memory. The processor may perform factory data reset while at least one application and a first file are stored in the memory, the first file being maintained in the memory independently of the factory data reset, and the at least one application being discarded in the memory in response to performing the factory data reset; may restore the at least one application by using the first file maintained in the memory after completion of the factory data reset; and may discard the first file in the memory in response to detection of a designated input after restoration of the at least one application is completed.

An electronic device according to various embodiments may include: a memory; multiple switches having designated functions assigned thereto, respectively; and a processor operatively connected to the multiple switches and the memory. The processor may be configured to: identify a partition to store a designated file, among multiple partitions defined inside the memory, in response to simultaneously pressing of designated switches among the multiple switches by the user; and maintain the designated file in the memory when the identified partition is formatted by performing factory data reset, in response to identifying the partition.

Advantageous Effects of Invention

An electronic device and a method thereof, according to various embodiments, may protect an application (for example, an application installed by the manufacturer of the electronic device) installed in a partition formatted by a factory data reset function, from the factory data reset function performed in the process of manufacturing the electronic device. Therefore, the application produced by the manufacturer of the electronic device can be delivered to the consumer of the electronic device in spite of the factory data reset function.

Advantageous effects obtainable from the disclosure may not be limited to the above-mentioned effects, and other effects which are not mentioned may be clearly understood, through the following descriptions, by those skilled in the art to which the disclosure pertains.

DETAILED DESCRIPTION

Figure 1:
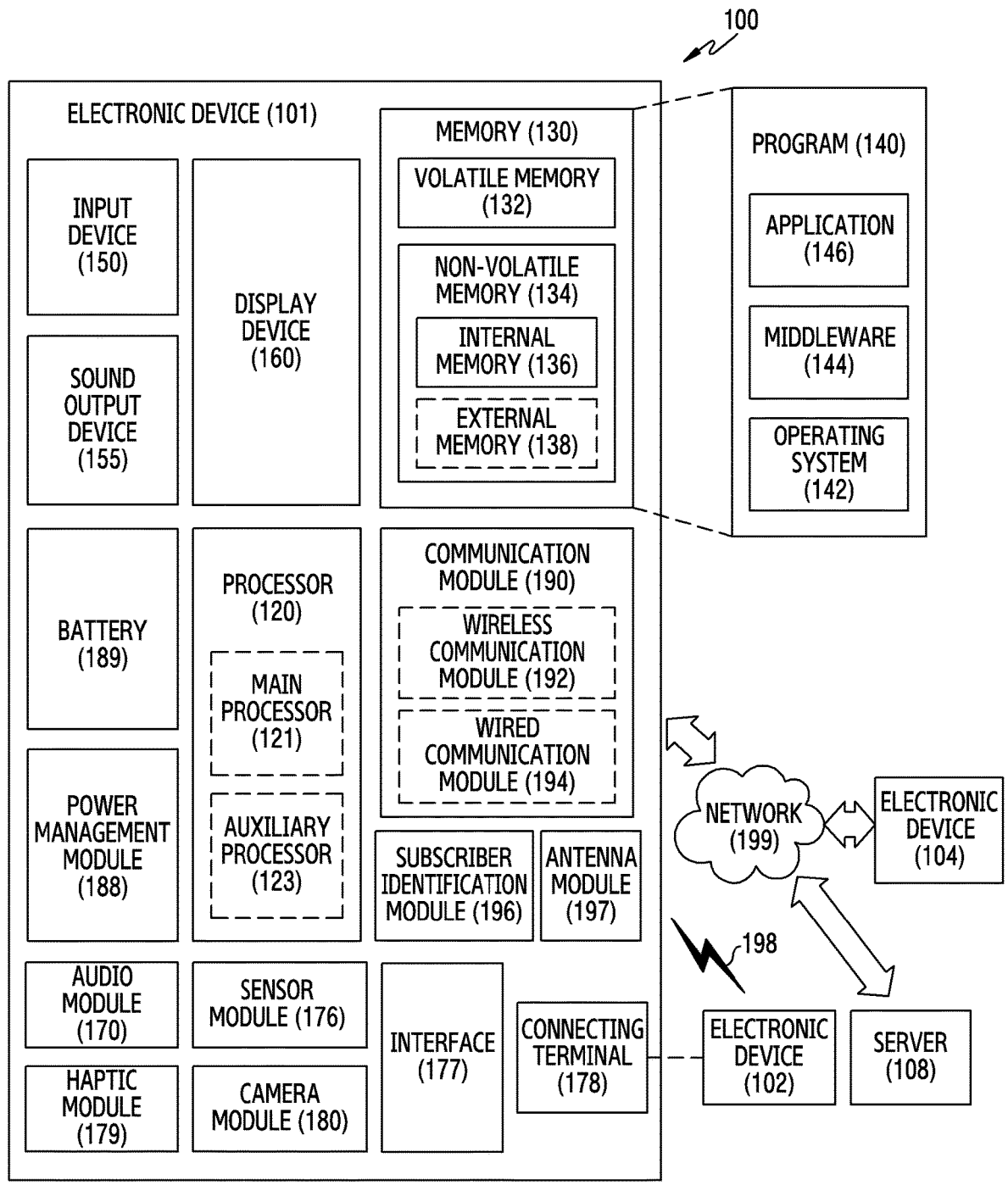
FIG. 1 is a block diagram illustrating an electronic device 101 in a network environment 100 according to various embodiments.

Hereinafter, various embodiments of the disclosure will be described with reference to the accompanying drawings.

As used herein, the expression "have", "may have", "include", or "may include" refers to the existence of a corresponding feature (e.g., numeral, function, operation, or constituent element such as component) and does not exclude the existence of additional features.

The expressions "a first", "a second", "the first", "the second", and the like as used herein may modify various elements regardless of the order and/or the importance thereof, and are used merely to distinguish between one element and any other element without limiting the corresponding elements. For example, a first user device and a second user device may indicate different user devices regardless of the order or importance thereof. For example, a first element may be termed a second element, and similarly, a second element may be termed a first element without departing from the scope of the disclosure.

It should be understood that when an element (e.g., first element) is referred to as being (operatively or communicatively) "connected" or "coupled" to another element (e.g., second element), it may be directly connected or coupled directly to the other element or any other element (e.g., third element) may be interposer between them. In contrast, it should be understood that when an element (e.g., first element) is referred to as being "directly connected" or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit).

According to some embodiments, the electronic device may be a home appliance. The hole appliance may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a flexible electronic device or a foldable electronic device. Further, the electronic device according to embodiments of the disclosure is not limited to the aforementioned devices, and may include a new electronic device according to the development of technology.

In the disclosure, the term "user" may refer to a person using an electronic device or a device (e.g., artificial intelligence electronic device) using an electronic device.

Hereinafter, various embodiments of the disclosure will be described in detail with reference to the accompanying drawings. In the accompanying drawings, the sizes of some elements may be exaggerated or reduced for the convenience of description. For example, the size and thickness of each element are arbitrarily illustrated for the convenience of description, and thus the disclosure is not limited by the illustrated size and thickness.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas and at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
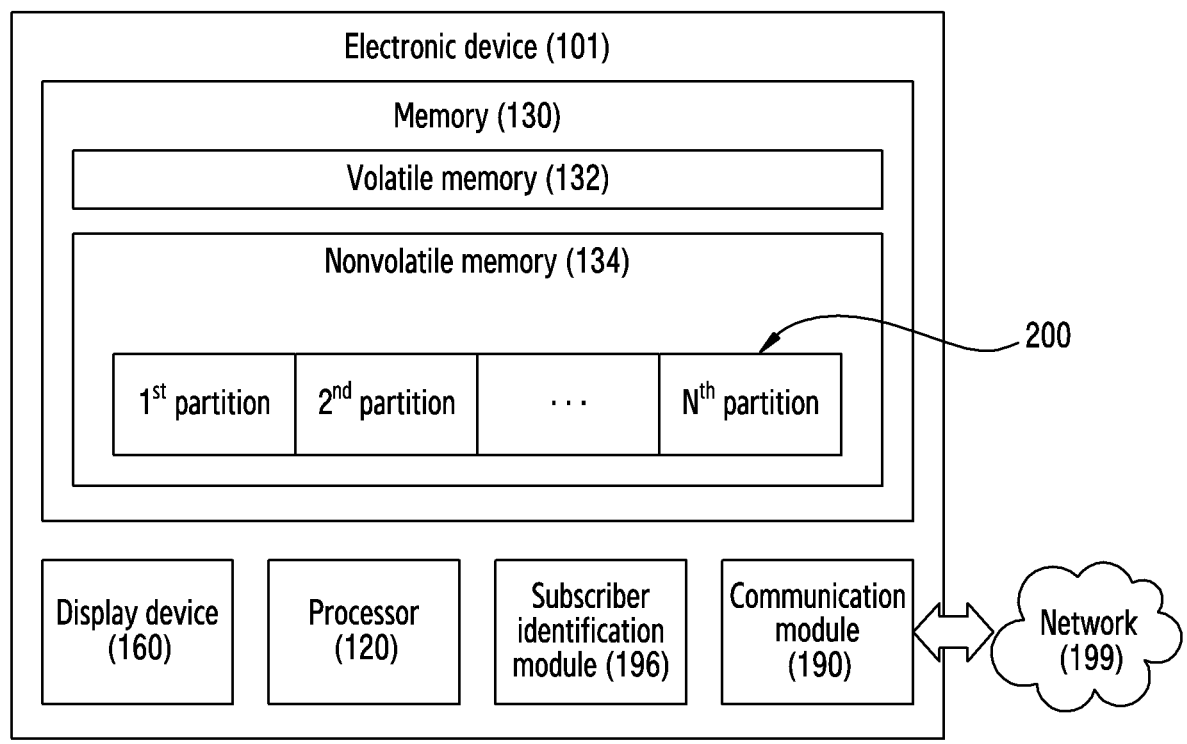
FIG. 2 is a diagram illustrating an operation of performing a factory data reset (FDR) function by an electronic device according to various embodiments.

FIG. 2 is a diagram illustrating an operation of performing a factory data reset (FDR) function by an electronic device 101 according to various embodiments. The electronic device 101 of FIG. 2 and components included in the electronic device 101 may correspond to the electronic device 101 of FIG. 1 and the components included in the electronic device 101 of FIG. 1. The electronic device 101 may correspond to any one of a smart phone, a smart pad, a tablet PC, and a personal digital assistant (PDA).

Referring to FIG. 2, the electronic device 101 may include a processor 120. The processor 120 may calculate data using one or more instructions. The processor 120 may include at least one of an arithmetic logical unit (ALU), a field programmable gate array (FPGA), an integrated circuit (IC), and a large scale integration (LSI) used for data operation.

Referring to FIG. 2, the electronic device 101 may include a memory 130 for storing one or more instructions or data that can be identified by the processor 120. The memory 130 may include at least one of a volatile memory 132 or a nonvolatile memory 134 used by the electronic device 101. The volatile memory 132 may correspond to a static random access memory (SRAM) or a dynamic RAM (DRAM). Data stored in the nonvolatile memory 134 may not be deleted even when the power supply to the electronic device 101 is stopped. The nonvolatile memory 134 may correspond to not only a magneto-resistive RAM (MRAM), a spin-transfer torque MRAM (STT-MRAM), a phase-change RAM (PRAM), a resistive RAM (RRAM), a ferroelectric RAM (FeRAM), but also a flash memory, an embedded multimedia card (eMMC), a solid state drive (SSD), etc.

The processor 120 may manage a storage space configured by the nonvolatile memory 134, based on a partition. The partition may be defined by an operating system (OS). The operating system is system software executed by the processor 120. The electronic device 101 may manage hardware components included in the electronic device 101 by executing an operating system. The operating system may provide an application programming interface (API) as applications that are software other than system software.

Referring to FIG. 2, N partitions 200 defined in the nonvolatile memory 134 are shown. The processor 120 may store data to be stored in the nonvolatile memory 134 in one of the N partitions 200 corresponding to the type of data. For example, the processor 120 may store one or more files necessary for execution of an application running on the operating system in a first partition, and may store cache data identified by the processor 120 in a second partition.

When a user of the electronic device 101, an application running on the processor 120, or an operating system accesses data stored in the nonvolatile memory 134, the processor 120 may allow access to the data, based on an access right independently assigned to each of the user, the application, or the operating system. For example, one of the N partitions 200 may only be read by a user and may not be able to write or change data by the user (read only). Any of the N partitions 200 may be capable of reading and writing by an application or a user (readable and writable).

The electronic device 101 may perform a factory data reset function, which is a function of initializing data of one or more partitions designated by an operating system among the N partitions 200. The designated partitions to be removed by the factory data reset function may be at least one of the remaining partitions (e.g., a first partition in which applications are stored) other than a partition in which system software such as an operating system is stored among the N partitions 200. After the user uses the electronic device 101, if the user wants to change the state of the electronic device 101 to a state at a designated time (i.e., when the user purchases the electronic device 101), the factory data reset function can be used.

Referring to FIG. 2, the electronic device 101 may include a display device 160 controlled by the processor 120 to visually provide a user interface to a user. The display device 160 may include a display in which at least a portion of the electronic device 101 is viewed to the outside through a housing. The display may visually output information to a user by using at least one of an organic light emitting diodes (OLED), a liquid crystal display (LCD), and a light emitting diode (LED).

In order for a user to control a visually provided user interface more intuitively, the electronic device 101 may include a touch screen panel (TSP) (not shown) disposed on the display of the display device 160. The touch sensor panel may detect a location of an object (e.g., a user's finger or a stylus) that touches the display or is hovered on the display using at least one of a resistive film, capacitive components, surface acoustic wave, and infrared.

The user may initiate the factory data reset function by controlling the user interface. The factory data reset function may be initiated not only by the user who purchased the electronic device 101, but also by various subjects and situations. For example, during production or sale of the electronic device 101, to collectively delete data being accumulated in the electronic device 101 during testing operation, a tester of the electronic device 101 may initiate a factory data reset function. The tester may be associated with at least one of a production company of the electronic device 101, a testing company of the electronic device 101, and a sales company of the electronic device 101.

Referring to FIG. 2, the electronic device 101 may include a communication module 190 to be connected to the network 199. The communication module 190 may be wirelessly connected to the network 199, based on at least one of Bluetooth, wireless-fidelity (Wi-Fi), and long term evolution (LTE). Alternatively, the communication module 190 may be connected to the network 199 by wire, based on at least one of Ethernet and a local area network (LAN). The communication module 190 may include one or more hardware components (e.g., a communication circuit, an antenna element, etc.) for exchanging data generated by the processor 120 and data generated by the network 199.

Referring to FIG. 2, the electronic device 101 may include a subscriber identification module (SIM) in which information for identifying the network 199 to be accessed by the communication module 190 is stored. The subscriber identification module may have a form (e.g., a SIM card) that can be held by a user. The electronic device 101 may include a slot capable of receiving a SIM card. When the user inserts the SIM card into the slot, the SIM card and the communication module 190 may be operatively connected. The communication module 190 may access the network 199, based on information stored in the inserted SIM card.

The factory data reset function may be initiated not only by the user who purchased the electronic device 101, but also by various subjects and situations. For example, when the SIM card is first inserted into the electronic device 101, the factory data reset function may be initiated. For example, when a parameter for identification of the network 199 (e.g., a code or key string identifying an operating entity of the network 199) is input to the electronic device 101, the factory data reset function may be initiated.

As the factory data reset function is initiated, one or more partitions designated by the operating system among the N partitions 200 may be initialized. At least one of an application of a manufacturer of the electronic device 101, an application of a manufacturer of an operating system, and an application of a third party may be removed by a factory data reset function. For example, when a manufacturer of the electronic device 101 installs an application in a partition that is reset by a factory data reset function (e.g., a first partition in which applications are stored), the application may be removed by the factory data reset function. The factory data reset function may be performed not only by the user who purchased the electronic device 101 but also by various subjects and situations. Before the user purchases the electronic device 101, the factory data reset function may be performed more than once. When the manufacturer of the electronic device 101 and the manufacturer of the operating system are different, the application of the manufacturer of the electronic device 101 may be removed by the factory data reset function before the user purchases the electronic device 101.

In spite of the factory data reset function performed before the electronic device 101 is purchased, the electronic device 101 according to various embodiments may store the application (e.g., an application installed by a manufacturer of the electronic device 101) stored in a partition that is reset by a factory data reset function. The electronic device 101 may store the application stored by the manufacturer of the electronic device 101 despite the factory data reset function. An application installed by a manufacturer of the electronic device 101 may be prevented from being removed by a factory data reset function performed before the user purchases the electronic device 101.

Figure 3:
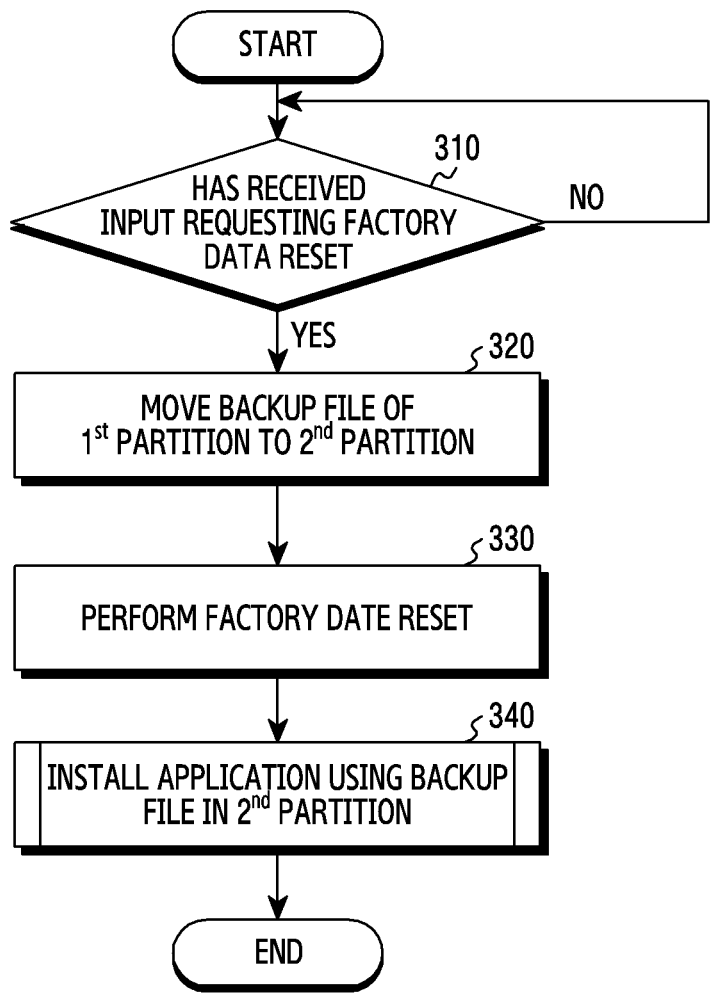
FIG. 3 is a flowchart illustrating an operation of restoring an application that is removed by a factory data reset function by an electronic device according to various embodiments.

FIG. 3 is a flowchart illustrating an operation of restoring an application that is removed by a factory data reset function by an electronic device according to various embodiments. The electronic device of FIG. 3 may correspond to the electronic device 101 of FIG. 1 or FIG. 2. The operation of FIG. 3 may be performed by the processor 120 included in the electronic device 101 of FIG. 1 or FIG. 2.

Referring to FIG. 3, in operation 310, the electronic device according to various embodiments may determine whether an input requesting a factory data reset function has been received. The input may be received through a user interface. For example, when a SIM card is first inserted into an electronic device or information for identifying a network is input to an electronic device, the electronic device may provide a user interface including a visual object (e.g., a button) for initiating a factory data reset function to a user. When the user touches the visual object, the electronic device may determine that an input requesting a factory data reset function has been received. For example, when designated switches among a plurality of switches included in the electronic device are simultaneously pressed within a designated time period (e.g., a time period from the time when booting is started to the time when booting is completed), the electronic device may determine that it has received an input requesting a factory data reset function.

Referring to FIG. 3, in response to receiving an input requesting the factory data reset function, in operation 320, the electronic device according to various embodiments may move the backup file stored in the first partition among a plurality of partitions defined in the memory to the second partition. The memory may correspond to the nonvolatile memory 134 of FIG. 1 or FIG. 2. The plurality of partitions may correspond to the N partitions 200 of FIG. 2. The first partition may be a partition in which an application is stored. The first partition may be a partition configured to be initialized by a factory data reset function.

The backup file may be a file obtained by compressing one or more files constituting at least one application stored in the first partition. One or more applications included in the backup file may be applications designated by a manufacturer of the electronic device. The backup file may be preloaded in the first partition by a manufacturer of the electronic device.

The second partition may be a partition configured not to be initialized by a factory data reset function. When it is necessary to store the backup file from the factory data reset function, the second partition may be configured not to be initialized by the factory data reset function. The second partition may be a partition in which cache data generated by an electronic device or one or more files downloaded by firmware over the air (FOTA) are stored. Moving the backup file stored in the first partition to the second partition may correspond to an operation of moving the backup file from the first partition to the second partition or copying the backup file to the second partition.

Referring to FIG. 3, in operation 330, the electronic device according to various embodiments may perform a factory data reset function. After the backup file is moved or copied to the second partition, the electronic device may perform the factory data reset function. By the factory data reset function, one or more of the plurality of partitions may be formatted. For example, by the factory data reset function, all data in the first partition may be discarded. The electronic device may delete all applications stored in the first partition. Since the second partition is a partition configured not to be initialized by the factory data reset function, while the electronic device performs the factory data reset function, the backup file moved or copied to the second partition will be preserved even after the factory data reset function is performed. After the factory data reset function is completed, the electronic device may be rebooted.

Referring to FIG. 3, in operation 340, the electronic device according to various embodiments may install at least one application using a backup file moved or copied to the second partition. The electronic device may install one or more applications compressed in the backup file in the initialized first partition. Installation of at least one application by the electronic device using the backup file may be performed while the electronic device is rebooted. Installation of the application based on the backup file may be completed before execution of a process that blocks the installation of the application by an unauthorized process.

FIGS. 4A to 4D are exemplary diagrams illustrating N partitions defined in a memory of an electronic device according to various embodiments and data stored in each of the N partitions. Hereinafter, changes in data stored in each of the N partitions 200 when the electronic device performs the operations of FIG. 3 will be described with reference to FIGS. 4A to 4D. Referring to FIGS. 4A to 4D, data stored in a first partition 410, a second partition 420, and a third partition 430 among the N partitions 200 are conceptually illustrated.

Figure 4A:
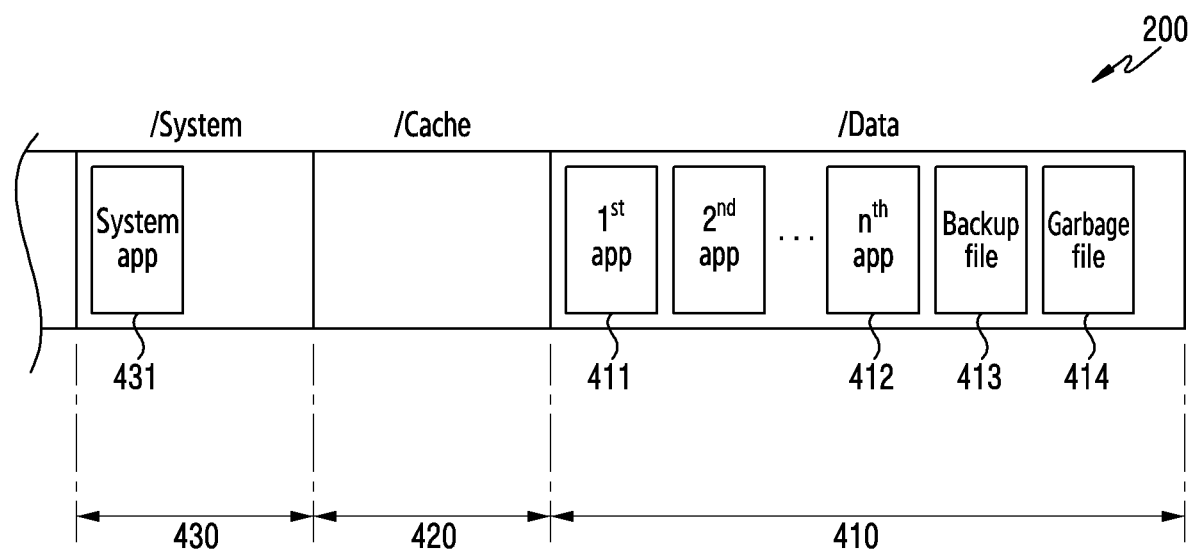
FIGS. 4A to 4D are exemplary diagrams illustrating N partitions defined in a memory of an electronic device according to various embodiments and data stored in the N partitions.

Referring to FIG. 4A, structures of N partitions 200 before the electronic device receives an input requesting a factory data reset function is illustrated. For example, before the operation 310 of FIG. 3 is performed, the memory of the electronic device (e.g., the nonvolatile memory 134 of FIG. 1 or FIG. 2) may store data in a manner similar to that shown in FIG. 4A.

Referring to FIG. 4A, the electronic device may store one or more applications (the first application 411 to the $n^{th}$ application 412) in the first partition 410. At least one of the applications provided by the manufacturer of the operating system as a bundle of the operating system, the applications provided by the electronic device manufacturer, and the applications installed by the user while using the electronic device may be installed in the first partition 410. Each of the applications may include one or more files required to execute the application. As the electronic device operates, data temporarily generated by the processor may be stored in a garbage file 414 in the first partition 410. As the electronic device operates, files included in each of the first to $n^{th}$ applications 411 to 412 may also be changed by an interaction with a user or update.

Referring to FIG. 4A, a backup file 413 including one or more applications installed in the electronic device may be included in the first partition 410. The backup file 413 may be provided by a manufacturer of an electronic device. The backup file 413 may be generated at the request of a user of the electronic device. The backup file 413 may be stored in the first partition 410 in a designated path in which writing or deletion is restricted. The backup file 413 may include one or more files related to each of the first to $n^{th}$ applications 411 to 412. The backup file 413 may be generated by compressing a plurality of files.

Referring to FIG. 4A, the electronic device may store cache data generated during the operation of the electronic device in the second partition 420. The cache data may include at least one of an application called by a processor of the electronic device and a result of an operation performed when the processor executes the application. The cache data may be stored in the second partition 420 or discarded from the second partition 420 from time to time while the processor of the electronic device is operating.

Referring to FIG. 4A, the electronic device may store at least one system application 431 related to an operating system in the third partition 430. When the electronic device is turned on by pressing the power switch that is visible to the outside through the electronic device when the electronic device is turned off (power-off), the electronic device may boot the electronic device by executing at least one system application 431 stored in the third partition 430. After booting is completed, the electronic device may execute at least one of the first to nth applications 411 to 412 stored in the first partition 410, based on the running system application 431 and a user input.

One or more partitions reset by the factory data reset function may be identified by the operating system or system application 431 among the N partitions 200. For example, one or more of the partitions reset by the factory data reset function may be identified among the remaining partitions except for the third partition 430. While performing the factory data reset function, the electronic device may initialize the first partition 410.

The electronic device according to various embodiments may identify the backup file 413 stored in the first partition 410 in response to a request for a factory data reset function. In response to the identification of the backup file 413, the electronic device may copy the identified backup file 413 to the second partition 420 that is distinguished from the first partition 410, similar to operation 320 of FIG. 3.

Figure 4B:
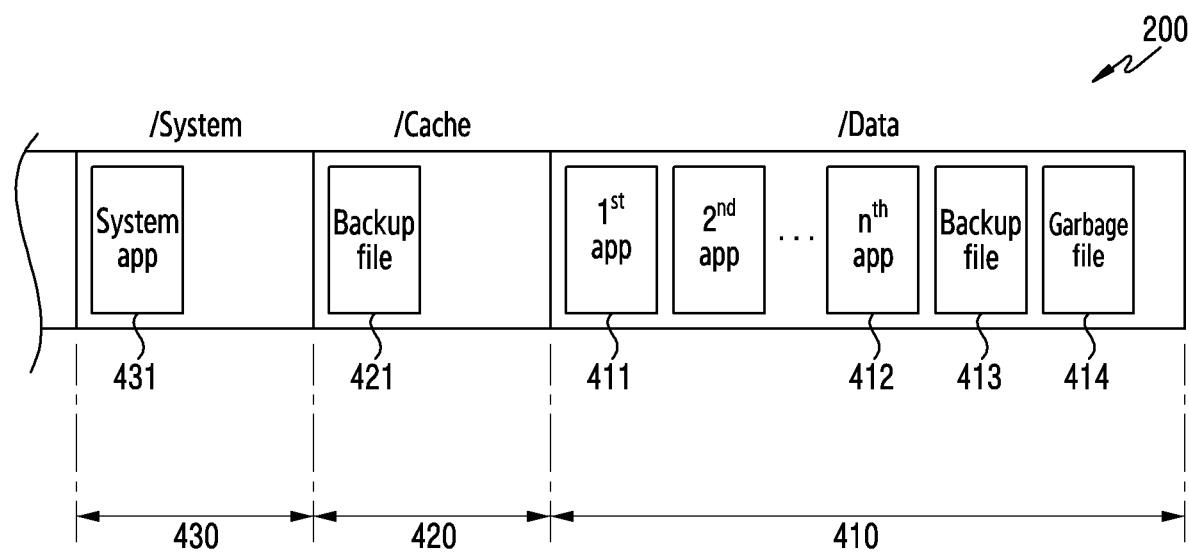

Referring to FIG. 4B, the structure of the N partitions 200 after the electronic device performs the operation 320 of FIG. 3 is illustrated. The backup file 413 may be stored in the second partition 420 that stores cache data and is not reset by a factory data reset function. After the backup file 413 is stored in the second partition 420, similar to the operation 330 of FIG. 3, the electronic device may initiate a requested factory data reset function.

Figure 4C:
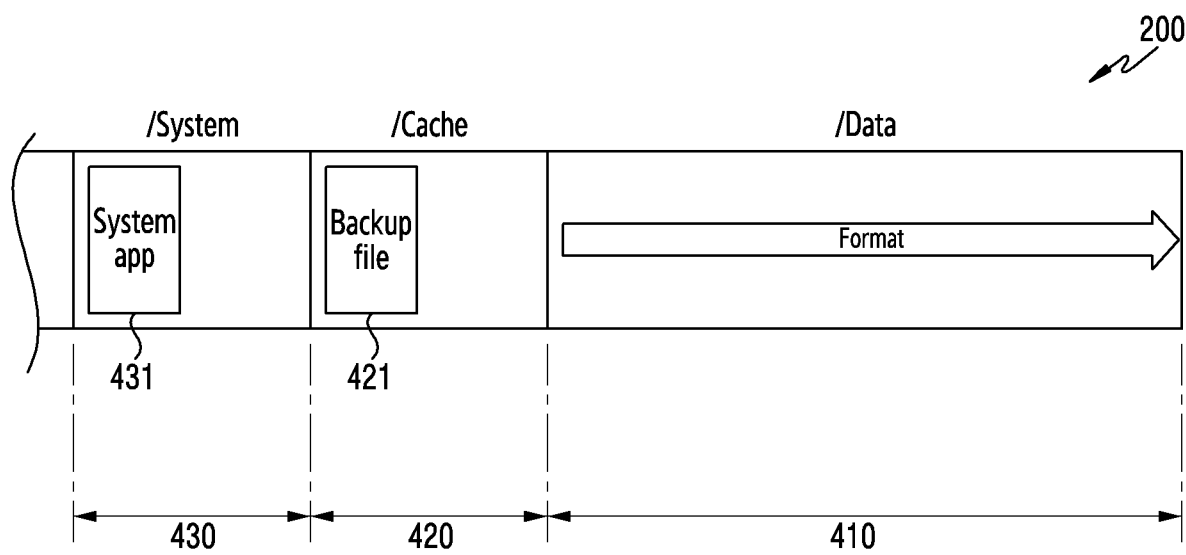

Referring to FIG. 4C, the structure of the N partitions 200 when the electronic device performs the operation 330 of FIG. 3 is illustrated. The electronic device may remove data stored in one or more partitions including the first partition 410 among the N partitions 200, based on a factory data reset function. When M partitions (M is a natural number less than N) of the N partitions 200 are reset based on the factory data reset function, the electronic device may sequentially format each of the M partitions.

Referring to FIG. 4C, while the electronic device performs a factory data reset function, all data stored in the first partition 410, for example, the first application 411 to the nth application 412, the backup file 413, and all of the garbage files 414 may be discarded from the memory. According to some embodiments, while performing the factory data reset function, the electronic device may remove remaining files other than the backup file 421 in the second partition 420.

After the electronic device has finished performing the factory data reset function, similar to operation 340 of FIG. 3, the electronic device may install an application included in the backup file 421 stored in the second partition in the first partition 410.

Figure 4D:
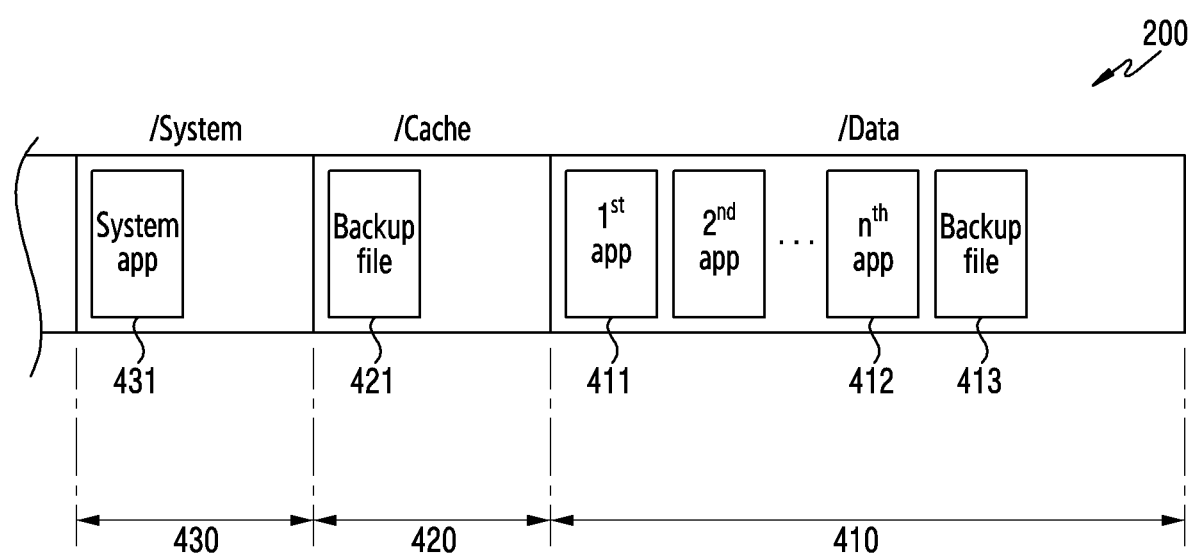

Referring to FIG. 4D, a structure of the N partitions 200 when the electronic device performs the operation 340 of FIG. 3 is illustrated. Based on the backup file 421 stored in the second partition 420, the electronic device may restore the first to nth applications 411 to 412 stored in the first partition 410 after performing the factory data reset function. The state of each of the first applications 411 to nth applications 412 installed in the first partition 410 may correspond to the state of each of the first to $n^{th}$ applications 411 to 412 when the backup file 421 is generated.

According to various embodiments, the electronic device can store the backup file 413, based on the second partition 420 that is not reset by the factory data reset function. According to some embodiments, the electronic device can store the backup file 413, based on a designated path that is not reset by the factory data reset function. The designated path may be a path configured to protect a file (e.g., a backup file 413) stored in the path from a factory data reset function.

Figure 5:
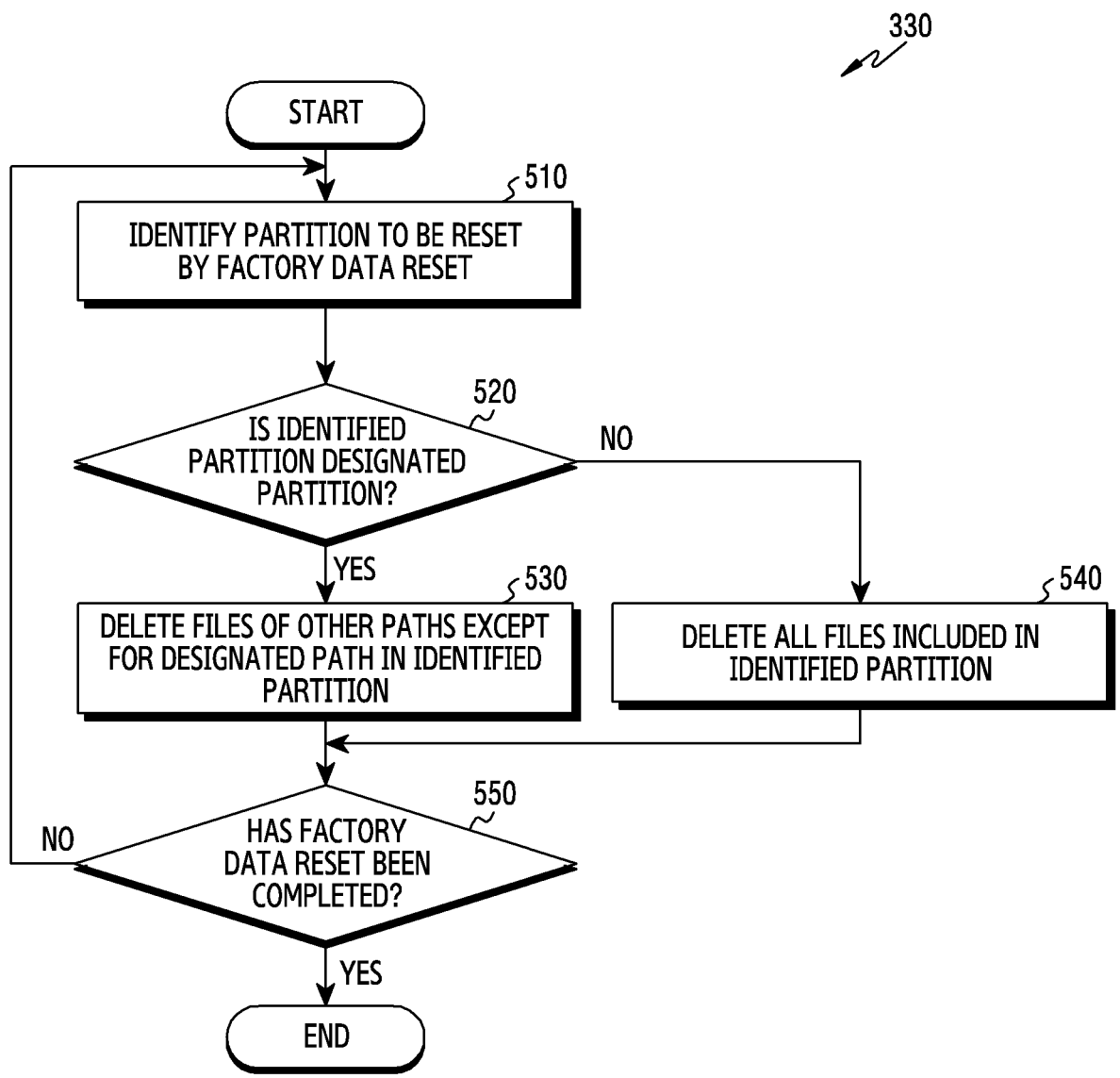
FIG. 5 is a flowchart illustrating an operation of storing a backup file while an electronic device according to some embodiments performs a factory data reset function.

FIG. 5 is a flowchart illustrating an operation of storing a backup file while an electronic device according to some embodiments performs a factory data reset function. The electronic device of FIG. 5 may correspond to the electronic device 101 of FIG. 1 or FIG. 2. The operation of FIG. 5 may be performed by the processor 120 included in the electronic device 101 of FIG. 1 or FIG. 2. The operation of FIG. 5 may be related to the operation 330 of FIG. 3.

Referring to FIG. 5, in operation 510, the electronic device according to some embodiments may identify a partition to be reset by a factory data reset function from among a plurality of partitions defined in a memory. The partition to be reset by the factory data reset function may be identified by an operating system or a system application running on the electronic device.

Referring to FIG. 5, in operation 520, the electronic device according to some embodiments may determine whether the identified partition is a designated partition. The designated partition may be a partition configured to store a backup file or a partition in which one or more applications backed up by the backup file are installed. The designated partition may be a partition to which a backup file has been moved. The designated partition may be a partition that stores cache data. For example, the designated partition may correspond to the first partition of FIGS. 2 to 3, the first partition 410 or the second partition 420 of FIGS. 4A to 4C.

Referring to FIG. 5, when the identified partition is a designated partition, in operation 530, the electronic device according to some embodiments may delete all of the remaining files except for one or more files stored in a designated path from among the plurality of files stored in the identified partition. For example, the electronic device may delete all files other than the backup file in the second partition 410.

Referring to FIG. 5, when the identified partition is not the designated partition, in operation 540, the electronic device according to some embodiments may delete all of the plurality of files stored in the identified partition.

Referring to FIG. 5, in operation 550, the electronic device according to some embodiments may determine whether the factory data reset function is completed. For example, the electronic device may determine whether an unreset partition exists among partitions that are targets of the factory data reset function. If there is an unreset partition, the electronic device returns to operation 510 to format or reset the unreset partition.

Referring to FIG. 5, the electronic device may preserve one or more files stored in a designated path in a designated partition among data stored in partitions that are targets of the factory data reset function. A backup file obtained by compressing one or more applications stored in at least one of the partitions subject to the factory data reset function may be stored in the designated path. When the electronic device performs a factory data reset function, based on the operation of FIG. 5, the backup file may be maintained in a partition that is a target of the factory data reset function. After the factory data reset function is completed, the electronic device may restore the application, based on the backup file maintained in the partition that is the target of the factory data reset function. An operation of restoring an application by the electronic device, based on the backup file may be similar to operation 340 of FIG. 3, for example.

Figure 6:
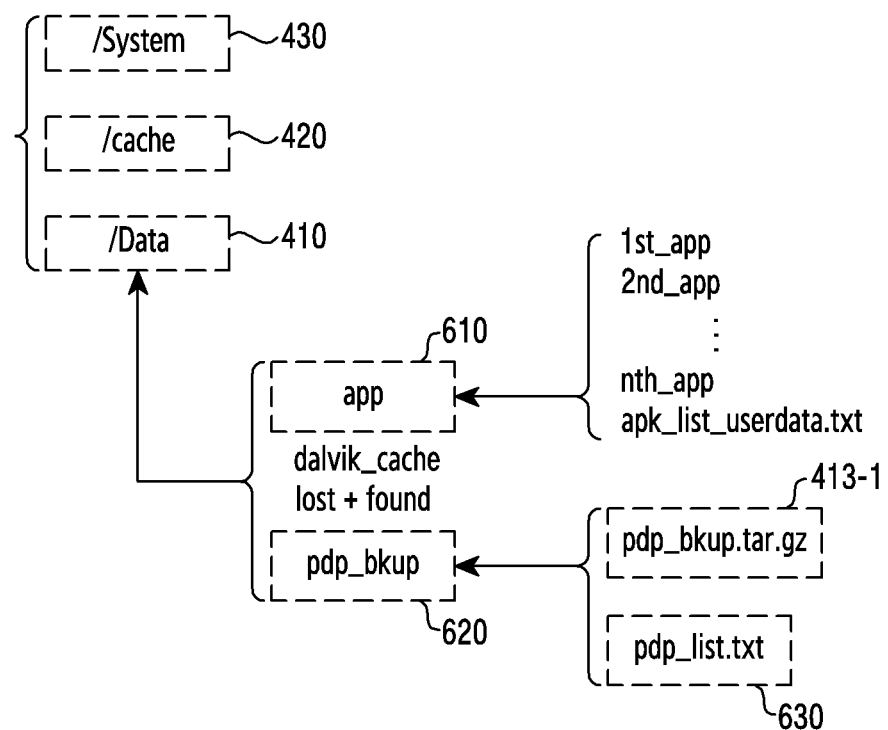
FIG. 6 is a flowchart illustrating an operation of storing a backup file using a designated path by an electronic device according to some embodiments.

FIG. 6 is a flowchart illustrating an operation of storing a backup file 413-1 using a designated path 620 by an electronic device according to some embodiments. The electronic device of FIG. 6 may correspond to the electronic device of FIG. 5.

Referring to FIG. 6, a first partition 410, a second partition 420, and a third partition 430 defined in a memory of an electronic device are illustrated. The memory of the electronic device may correspond to the nonvolatile memory 134 of FIG. 1 or FIG. 2. Each of the first partition 410, the second partition 420, and the third partition 430 may correspond to each of the first partition 410, second partition 420, and third partition 430 of FIGS. 4A to 4D.

Referring to FIG. 6, files stored in the first partition 410 and paths of files are visually illustrated. Within the first partition 410, the electronic device may install one or more applications in a specific path 610. For example, when a user requests installation of an application, the electronic device may generate a folder corresponding to the application in a specific path 610. The electronic device may store one or more files corresponding to the application in the created folder. One or more files corresponding to the application may be provided by a network service providing the application.

A backup file 413-1 including one or more applications installed in the electronic device may be stored in the first partition 410, for example, in a partition in which one or more applications are installed. The backup file 413-1 may be generated by compressing one or more applications designated by the manufacturer of the electronic device. The backup file 413-1 may be preloaded in the first partition 410 of the electronic device by the manufacturer of the electronic device. Along with the backup file 413-1, a list file 630 including identifiers of one or more applications stored in the backup file 413-1 may be provided. The identifiers of the applications may be, for example, the name of the application or the name of the package related to the application.

Referring to FIG. 6, at least one of the list file 630 and the backup file 413-1 may be stored in a path 620 designated in the first partition 410. According to some embodiments, one or more files constituting an application stored in a specific path 610 in which the application is installed may be copied into the designated path 620. Copying of one or more files into the designated path 620 may be performed before a connection between the electronic device and the network is established during the testing of the electronic device. In this case, the list file 630 may be used to identify or process one or more applications copied to the designated path 620. The designated path 620 may be a path set to protect a file stored in the path from a factory data reset function. For example, when the first partition 410 is set as a partition that is reset by the factory data reset function, when resetting the first partition 410 while performing the factory data reset function, the electronic device may not discard the file stored in the designated path 620.

The designated path 620 may correspond to a path for storing a file to be moved to the second partition 420 differentiated from the first partition 410 before the factory data reset function is performed. When a user performs a designated operation described later in FIG. 7 or 8, the electronic device may move one or more files stored in the designated path 620 from the first partition 410 to the second partition 420 before performing the factory data reset function. In this case, even though all files stored in the first partition 410 are discarded according to the factory data reset function, files stored in the designated path 620 may be preserved by moving to the second partition 420. The electronic device may restore one or more applications in the first partition 410, based on a file (e.g., a backup file) moved to the second partition 420.

Since the files stored in the designated path 620 are not discarded, the list file 630 and the backup file 413-1 may be stored in the designated path 620 of the first partition 410 even after the factory data reset function is performed. After the factory data reset function is performed, the electronic device may restore one or more applications in the first partition 410, based on the list file 630 and the backup file 413-1 stored in the designated path 620.

The backup file 413-1 may be stored in the path 620 designated when the electronic device is manufactured. For example, a manufacturer of the electronic device may copy a plurality of files to the first partition 410, based on an image file in which a plurality of files to be installed in the first partition 410 are compressed. In this case, the image file may be set to include the backup file 413-1 in the designated path 620.

The electronic device may perform a protection process of preserving the backup file 413-1 from a factory data reset function. The protection process may be a function of setting a specific file of the electronic device (e.g., the backup file 413-1 stored in the designated path 620) not to be removed by a factory data reset function. The protected specific files may be set not to be removed by at least one of an operation of formatting a partition by a factory data reset function and an operation of setting account information (e.g., setup wizard) after performing the factory data reset function. The protection process can be set using parameters or flags set in the file. The protection process may be performed based on a user's designated operation related to the electronic device (described later in FIG. 8). According to some embodiments, alternatively, a file including parameters related to the protection process may be provided in advance by the manufacturer of the electronic device. For example, the backup file 413-1 may include a flag related to protection processing in advance.

Moving the backup file 413-1 to the designated path 620 may be performed by a designated user's operation or a manufacturer of the electronic device. For example, while a manufacturer of the electronic device installs one or more applications in the memory of the electronic device, the backup file 413-1 including the one or more applications may be stored in the designated path 620. For example, when an inspector of the electronic device performs an operation designated in the electronic device while inspecting the electronic device, the electronic device may store the backup file 413-1 in the designated path 620.

Figure 7:
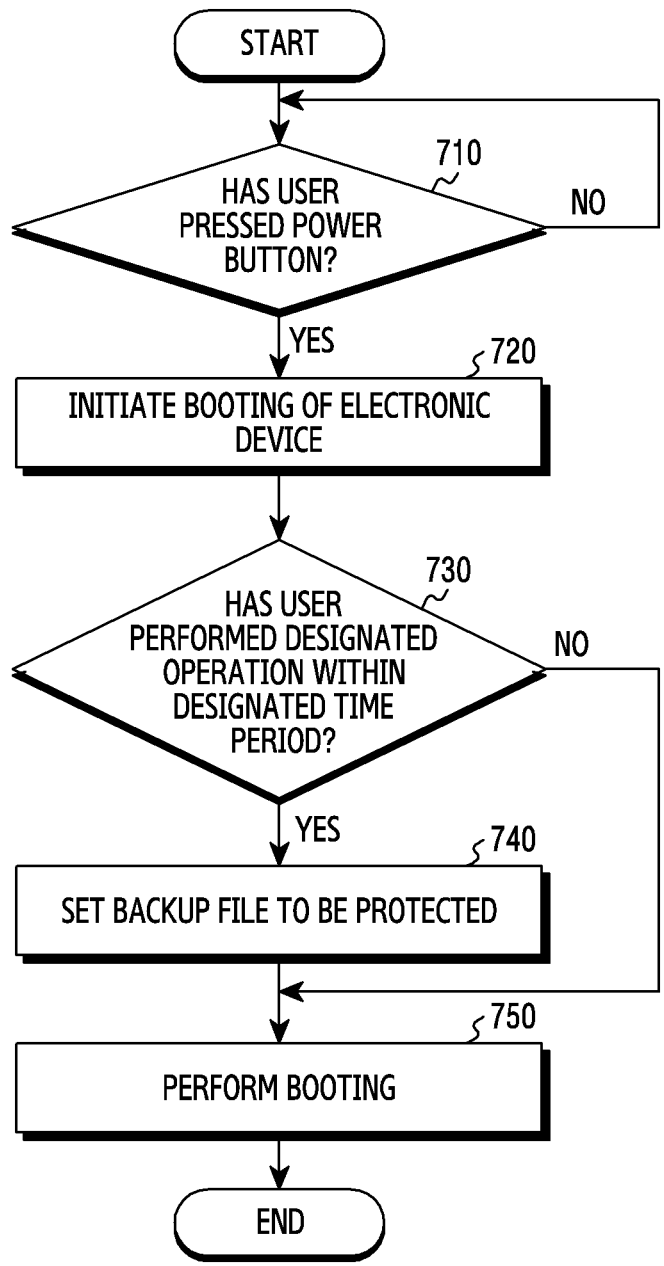
FIG. 7 is a flowchart illustrating an operation moving a backup file through a designated path that is not reset by a factory data reset function in response to a designated operation by an electronic device according to some embodiments.

FIG. 7 is a flowchart illustrating an operation moving a backup file through a designated path that is not reset by a factory data reset function in response to a designated operation by an electronic device according to some embodiments. The designated path may exist in a partition that is reset by a factory data reset function. The electronic device of FIG. 7 may correspond to the electronic device of FIGS. 5 to 6. The backup file of FIG. 7 may correspond to the backup file 413-1 of FIG. 6. The designated path of FIG. 7 may correspond to the designated path 620 of FIG. 6.

Referring to FIG. 7, in operation 710, the electronic device according to some embodiments may determine whether the user has pressed the power switch. The state of the electronic device before operation 710 may be a power-off state.

Referring to FIG. 7, in operation 720, the electronic device according to some embodiments may start booting in response to the user pressing the power switch. The electronic device may initiate booting, based on a system application stored in the nonvolatile memory 134 of FIG. 1 or FIG. 2. While booting is being performed, the electronic device may inform the user of the state of the electronic device related to booting. For example, the electronic device may notify the user of the state of the electronic device related to booting using at least one of an LED, a display, and a speaker.

Referring to FIG. 7, while the electronic device boots up, in operation 730, the electronic device according to some embodiments may determine whether the user performs a designated operation. The designated operation may correspond to an instruction to protect a backup file for storage of an application that is removed by the factory data reset function, based on a designated path that is not reset by the factory data reset function. The operation 730 may be performed only within a designated time period, for example, within a time period from when the electronic device starts booting until the electronic device completes booting. Examples of the designated operation performed by the user within the designated time period will be described later with reference to FIGS. 8A to 8B.

Referring to FIG. 7, in response to a user performing a designated operation, in operation 740, the electronic device according to some embodiments may set a backup file to be protected from a factory data reset function. For example, before performing the factory data reset function, the electronic device may set the backup file to be moved to the designated partition (e.g., second partition 420 of FIGS. 4A to 4D). While performing the factory data reset function, the electronic device may delete files other than the backup file located in the designated path while resetting the partition including the designated path, based on operations 520 to 530 of FIG. 5.

Referring to FIG. 7, after a user does not perform a designated operation or a backup file is set to be protected by operation 740, in operation 750, the electronic device according to some embodiments may continue to boot. When the user performs the designated operation, the electronic device may provide the user with a result of setting the backup file to be moved to the designated partition by operation 740.

Figure 8A:
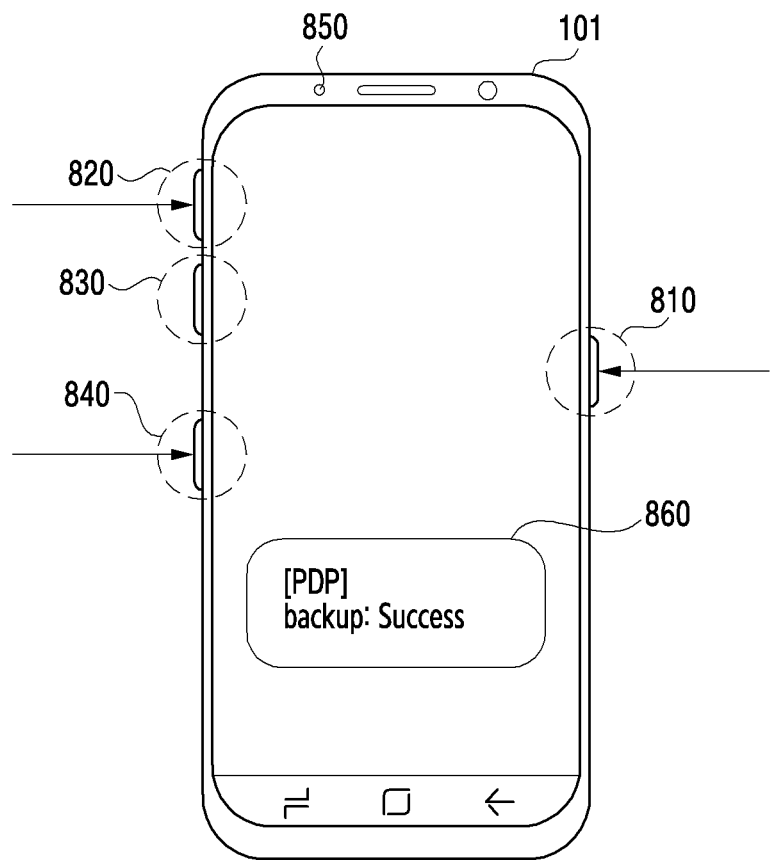
FIGS. 8A to 8B are exemplary diagrams illustrating an operation of storing a backup file in response to a user's designated operation by an electronic device according to some embodiments.
Figure 8B:
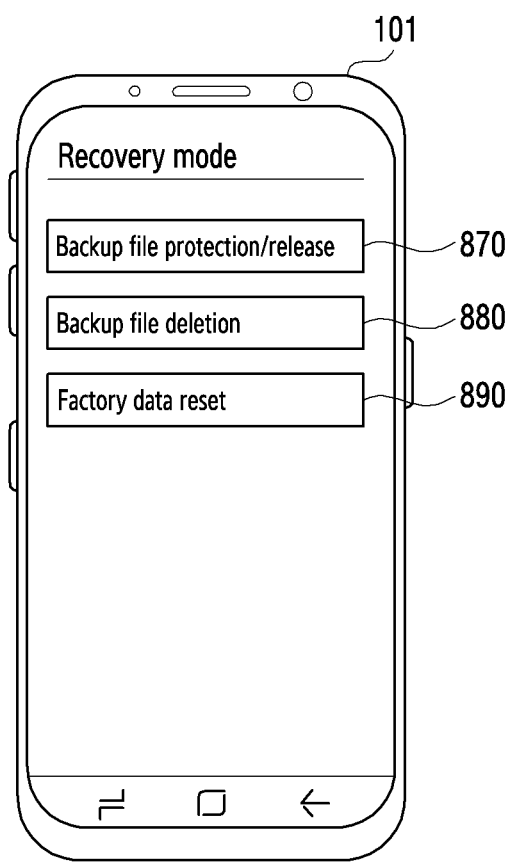

FIGS. 8A to 8B are exemplary diagrams illustrating an operation of preserving a backup file in response to a user's designated operation by an electronic device 101 according to some embodiments. The electronic device 101 of FIGS. 8A and 8B may correspond to the electronic device 101 of FIG. 1 or FIG. 2.

Referring to FIG. 8A, the electronic device 101 may be viewed to the outside through a housing and include a plurality of switches 810, 820, 830, and 840 to which a plurality of functions are respectively assigned. Each of the plurality of switches 810, 820, 830, and 840 may have a form of a hardware button. Functions assigned to each of the plurality of switches 810, 820, 830, and 840 may be functions that are distinguished from each other. For example, the switch 810 may be a power switch of the electronic device 101, the switch 820 may be a switch that increases the volume of the speaker of the electronic device 101, the switch 830 may be a switch that decreases the volume of a speaker of the electronic device 101, and the switch 840 may be a switch that executes a voice recognition application installed in the electronic device 101.

In a state in which the electronic device 101 is not operating (e.g., in a power-off state), the user may turn on the electronic device 101 by pressing the switch 810. After the electronic device 101 is turned on, the user can perform a designated operation related to preserving the backup file by simultaneously pressing designated switches (e.g., switches 810, 820, 840) among a plurality of switches 810, 820, 830, and 840. The electronic device may be configured to move a file (e.g., a backup file) stored in a designated path to a partition that is not reset by a factory data reset function (e.g., the second partition 420 of FIGS. 4A to 4D), based on the operation 740 of FIG. 7, in response to the user's designated operation input during booting. Moving the file stored in the designated path to the partition may be performed at or after operation 740 (e.g., after operation 740 and before initiation of the factory data reset function).

After setting to move the file stored in the designated path to the partition, the electronic device 101 may copy the backup file or may feedback a result of setting the file to be moved to the user. For example, the electronic device 101 may provide feedback to the user of a result of setting the backup file to be copied or moved by controlling the LED 850, which is at least partially viewed to the outside through the housing. For example, the electronic device 101 may control a motor that is included in the electronic device 101 and generates vibrations, thereby feeding back a result of setting to copy or to move a backup file to the user. For example, the electronic device 101 may output the message 860 on the display and provide feedback to the user of a result of setting the backup file to be copied or moved.

The designated operation related to the preservation of the backup file may include not only an operation of simultaneously pressing the designated switches 810, 820, 840 but also an operation of connecting a device that outputs a designated resistance value or a designated signal to the electronic device 101 in a form that can be inserted into the earphone terminal of the electronic device 101 or a USB form. The electronic device may release the preservation of the backup file, based on another operation (e.g., pressing the designated switches 810 and 820 at the same time) distinct from the designated operation. Releasing the preservation of the backup file means canceling or deactivating the setting to move the backup file stored in the designated path, based on the operation 740 to a partition not reset by the factory data reset function. The operation of releasing the preservation of the backup file may be input to the electronic device by the user at the same time as when the designated operation related to the storage of the backup file is performed.

According to an embodiment, the operation of moving the backup file to a designated path may be supported by the operating system of the electronic device 101 and may be performed by a user interface that may be provided to a user while booting is performed. The user interface that may be provided to the user during booting may be, for example, a user interface provided in a recovery mode provided by the Android operating system.

FIG. 8B is a diagram illustrating an example of a user interface that is output to a user in response to a user's designated operation while the electronic device 101 is booting according to some embodiments. The user interface illustrated in FIG. 8B may be output in response to a user's operation for changing the mode of the electronic device 101 to the recovery mode.

Referring to FIG. 8B, the user interface may include a menu 890 for executing the factory data reset function, as well as a menu 870 for protecting or preserving a backup file or a menu 880 for deleting a backup file. The menu 870 may be a menu for toggling whether to protect the backup file. Accordingly, the user may protect the backup file or cancel the protection process of the backup file using the menu 870. For example, when the user selects the menu 870, the electronic device 101 may copy or move the backup file to a designated path (e.g., the designated path 620 of FIG. 6), based on the operation 740 of FIG. 7. As another example, the user may select the menu 870 and may activate the movement of the backup file stored in the designated path from the first partition where the backup file is stored to the second partition (e.g., partition not reset by factory data reset function) before the factory data reset function is performed. After activating the movement, when the user selects the menu 870 again, the electronic device may deactivate movement of the backup file from the first partition to the second partition.

When the user selects the menu 880, the electronic device 101 may delete the backup file.

According to various embodiments, a backup file used to restore one or more applications removed by a factory data reset function may be discarded from the memory in order to save the capacity of the memory of the electronic device 101 after restoration of one or more applications is completed. After the electronic device 101 is activated by the consumer (e.g., after the consumer's account information is input to the electronic device 101), the backup file may be discarded from the memory.

Figure 9:
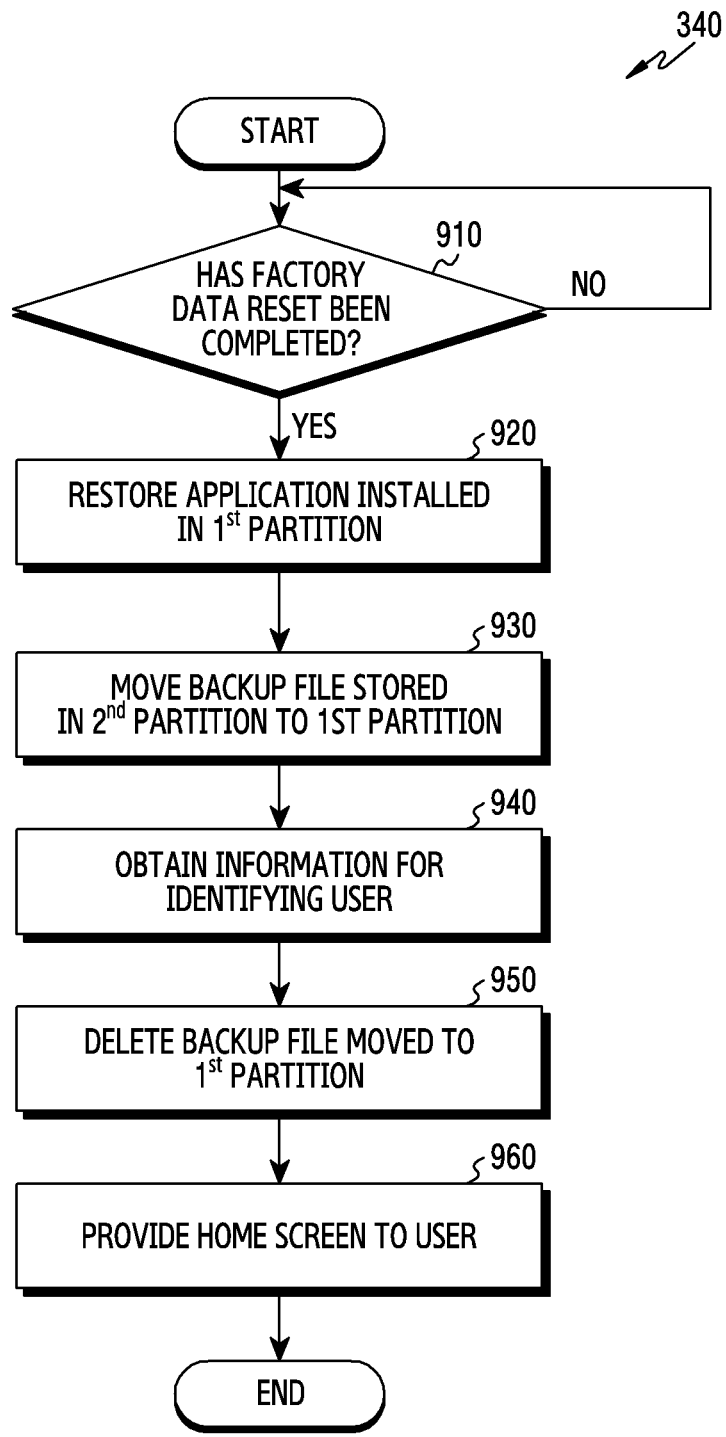
FIG. 9 is a flowchart illustrating an operation performed by an electronic device according to various embodiments after completion of a factory data reset function.

FIG. 9 is a flowchart illustrating an operation performed by an electronic device according to various embodiments after completion of a factory data reset function. The electronic device of FIG. 9 may correspond to the electronic device 101 of FIG. 1 or FIG. 2. The operations of FIG. 9 may be performed by the processor 120 included in the electronic device 101 of FIG. 1 or FIG. 2. The operation of FIG. 9 may be related to the operation 340 of FIG. 3.

Referring to FIG. 9, in operation 910, the electronic device according to various embodiments may determine whether the factory data reset function has been completed. For example, the electronic device may determine whether the operation of formatting one or more partitions has been completed, based on operation 330 of FIG. 3. One or more applications installed in the electronic device may be deleted by the factory data reset function.

Referring to FIG. 9, in response to the completion of the factory data reset function, in operation 920, the electronic device according to various embodiments may restore one or more applications installed in the first partition before the factory data reset function is performed. The electronic device may identify a backup file that includes one or more applications and is stored in the second partition (e.g., the second partition 420 of FIGS. 4A to 4D) that is distinguished from the first partition and excluded from the factory data reset function, or in a path (e.g., the designated path 620 of FIG. 6) set not to be discarded by the factory data reset function in the partition that is the target of the factory data reset function among a plurality of partitions defined in the memory of the electronic device. The backup file may be maintained in the memory of the electronic device independently of the factory data reset function. The electronic device may restore one or more applications installed in the first partition before performing the factory data reset function based on the identified backup file.

Operation 920 may be performed after the electronic device is rebooted, which is performed after the factory data reset function is performed. The electronic device may complete the operation 920 of restoring one or more applications, before execution of a process that stops installing an unauthorized application in the first partition, as a process executed by the operating system.

Referring to FIG. 9, when the backup file is stored in the second partition that is distinguished from the first partition, in operation 930, the electronic device according to various embodiments may move or copy the backup file stored in the second partition to the first partition. When the backup file stored in the second partition is moved or copied to the first partition, the backup file in the first partition may be stored in a path before being discarded. After the factory data reset function is performed, the state of the backup file may be changed to a state that is not protected from the factory data reset function.

Referring to FIG. 9, in operation 940, the electronic device according to various embodiments may obtain information for identifying the user from the user. Information for identifying the user may be used for identification of the user by the operating system. The information for identifying the user may include at least one of information necessary to generate a user interface, for example, a language used by the user and a type of a keyboard used by the user. The information for identifying the user may include at least one of the user's region and the user's account information. Information for identifying the user may be obtained from the user, based on a user interface output from the electronic device after the factory data reset function is completed. The electronic device may perform initialization of one or more applications restored in the operating system or operation 920 as well as identification of the user who uses the electronic device, based on the acquired information.

Referring to FIG. 9, in response to obtaining information for identifying a user, in operation 950, the electronic device according to various embodiments may delete the backup file stored in the first partition by operation 930. By deleting the backup file, the amount of storage space usable in memory may increase.

Referring to FIG. 9, in response to obtaining information for identifying a user, in operation 960, the electronic device according to various embodiments may provide a home screen to the user. The home screen may be a user interface including a list of one or more applications restored in the first partition. Operation 950 and operation 960 may be simultaneously performed by the electronic device in response to obtaining information for identifying a user. After the home screen is provided to the user, the state of the electronic device may be changed to a state in which one or more applications can be executed (e.g., an idle state) according to a user's input.

Figure 10:
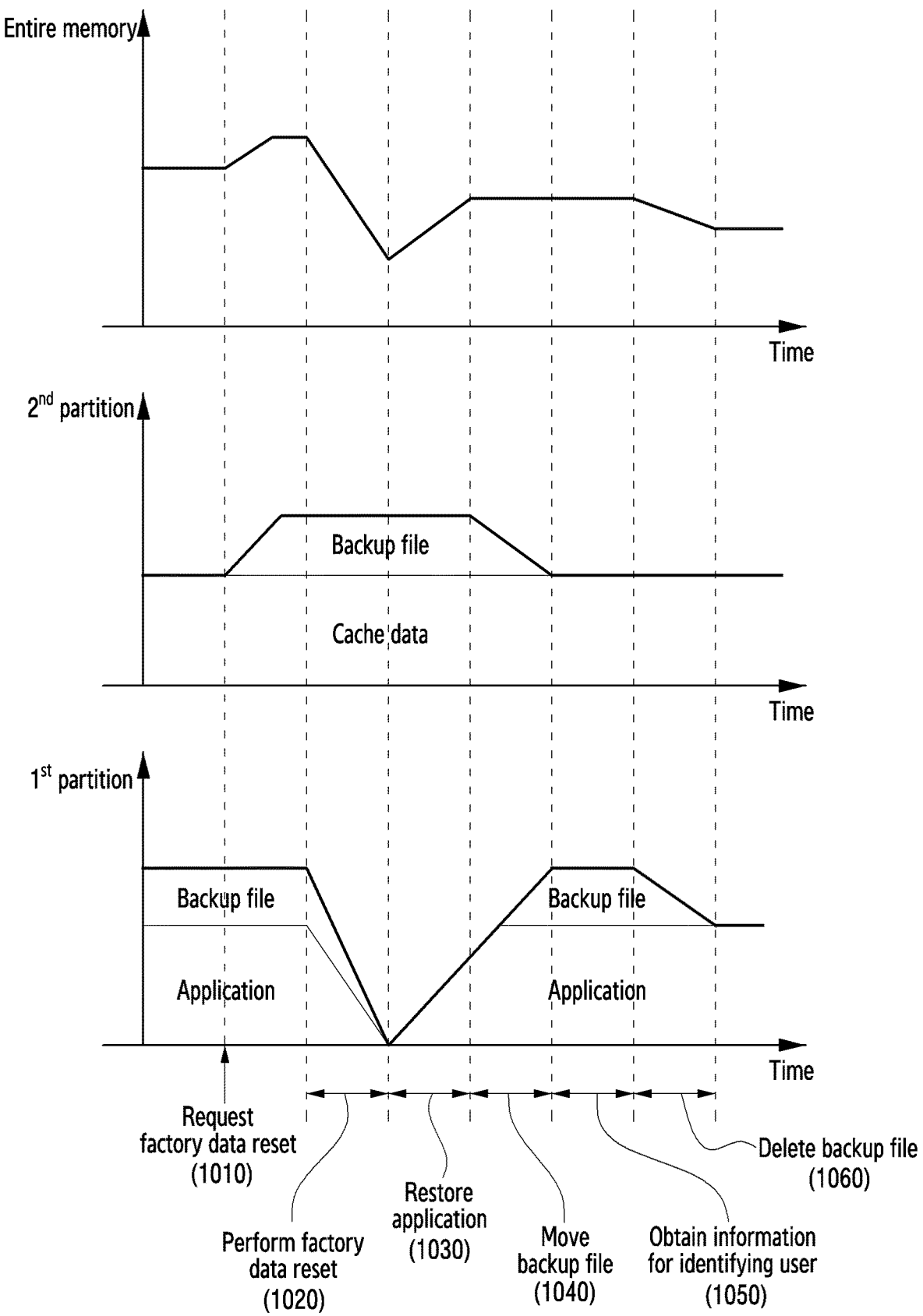
FIG. 10 is an exemplary graph illustrating a change in size of data stored in a memory of an electronic device while the electronic device according to various embodiments performs a factory data reset function.

FIG. 10 is an exemplary graph illustrating a change in size of data stored in a memory of an electronic device while the electronic device according to various embodiments performs a factory data reset function. The electronic device of FIG. 10 may correspond to the electronic device 101 of FIG.

1 or FIG. 2. The memory of FIG. 10 may correspond to the nonvolatile memory 134 of FIG. 1 or FIG. 2.

Referring to FIG. 10, the entire memory of the electronic device and the size of data stored in each of the first and second partitions defined in the memory are illustrated over time. The size of data stored in the entire memory may correspond to the sum of the sizes of data stored in each of the partitions defined in the memory. The first partition may be a partition configured to install one or more applications. According to various embodiments, a backup file including the one or more applications may be stored in the first partition. The second partition may be a partition configured to store cache data. For convenience of explanation, it is assumed that there is no change in the size of the cache data due to the operation of the electronic device. The first partition may be designated as a partition reset by the factory data reset function, and the second partition might not be designated as a partition reset by the factory data reset function.

Referring to FIG. 10, at a time 1010, the electronic device may receive a request for a factory data reset function. The request for the factory data reset function may occur, for example, when the menu 890 of FIG. 8B is selected by a user or an inspector associated with the electronic device, when the SIM card is first inserted into the electronic device, or when a parameter for network identification is input to the electronic device.

In response to a request for a factory data reset function, the electronic device may identify a backup file including one or more applications and a first partition in which the backup file is stored. In response to identification of the backup file and the first partition, the electronic device may move the backup file stored in the first partition to a second partition that is distinct from the first partition. For example, the electronic device may move or copy the backup file, based on the operation 320 of FIG. 3. Referring to FIG. 10, after a time point 1010, while the electronic device copies the backup file from the first partition to the second partition, the size of data stored in the second partition and the size of data stored in the entire memory may be increased by copying the backup file. When moving the backup file from the first partition to the second partition, the size of data stored in the entire memory may be maintained before and after the time point 1010.

After copying of the backup file is completed, within the time period 1020, the electronic device may perform a factory data reset function corresponding to the request. The factory data reset function may be performed based on the operation 330 of FIG. 3 or the operations of FIG. 5. Referring to FIG. 10, within a time period 1020 in which the factory data reset function is performed, the size of data stored in the entire memory may be reduced. Since the first partition is reset by the factory data reset function, the size of the data stored in the first partition may converge to zero within the time period 1020. Since the second partition is not reset by the factory data reset function, the size of data stored in the second partition might not be changed within the time period 1020. As the plurality of partitions including the first partition are reset, the size of data stored in the entire memory may be gradually decreased within the time period 1020.

After the execution of the factory data reset function is completed, within the time period 1030, the electronic device may install one or more applications in the first partition, based on the backup file stored in the second partition. The electronic device may restore one or more applications installed in the electronic device before performing the factory data reset function using the backup file. Installing one or more applications in the first partition, based on the backup file, may be performed based on operation 340 of FIG. 3 and operations 910 to 920 of FIG. 9. Referring to FIG. 10, within a time interval 1030 in which one or more applications are installed in the first partition, based on the backup file stored in the second partition, the size of data stored in the first partition and the size of data stored in the entire memory may increase.

After restoration of one or more applications, based on the backup file is completed, within a time period 1040, the electronic device may move the backup file stored in the second partition to the first partition. Although not shown, between the time interval 1030 and the time interval 1040, the electronic device may perform a reboot. Moving the backup file from the second partition to the first partition may be performed based on operation 930 of FIG. 9. Referring to FIG. 10, within a time period 1040 in which the backup file is moved from the second partition to the first partition, the size of data stored in the first partition may increase by the size of the backup file. When the backup file stored in the second partition is discarded according to the movement of the backup file, the size of the data stored in the entire memory within the time period 1040 may be kept constant.

After the backup file stored in the second partition is moved to the first partition, within the time interval 1050, the electronic device may obtain information for identifying the user. The electronic device may acquire information for identifying a user, based on operation 940 of FIG. 9. After acquiring the information for identifying the user, within the time interval 1060, the electronic device may remove the backup file moved to the first partition. Removing the backup file moved to the first partition may be performed based on operation 950 of FIG. 9. Referring to FIG. 10, within a time period 1060, the size of data stored in the entire memory and the size of data stored in the first partition may decrease as the backup file moved to the first partition is removed. Within the time period 1060, a home screen based on the operation 960 of FIG. 9 may be provided to the user.

Figure 11:
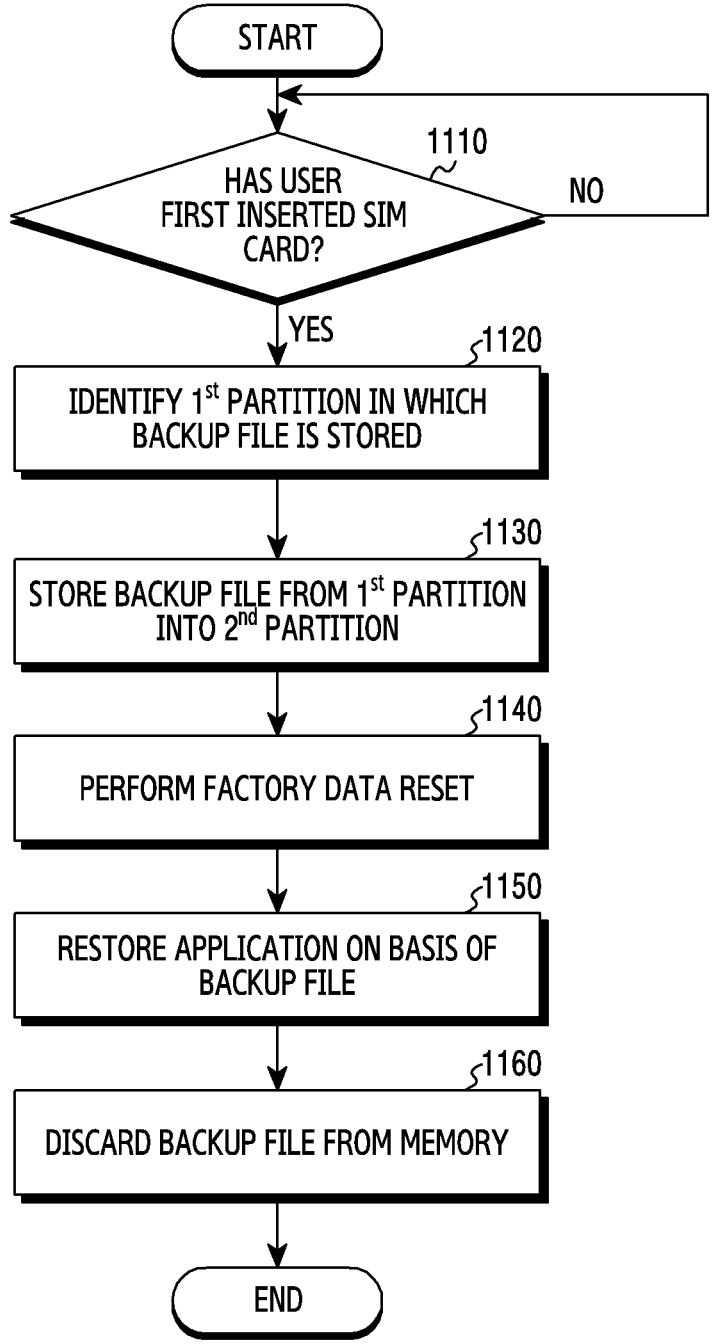
FIG. 11 is a flowchart illustrating an operation of performing a factory data reset function, based on a SIM card inserted for the first time and restoring one or more applications removed by the factory data reset function by an electronic device according to an embodiment.

FIG. 11 is a flowchart illustrating an operation of performing a factory data reset function, based on a SIM card inserted for the first time and restoring one or more applications removed by the factory data reset function by an electronic device according to an embodiment. The electronic device of FIG. 11 may correspond to the electronic device 101 of FIG. 1 or FIG. 2. The operation of FIG. 11 may be performed by the processor 120 included in the electronic device 101 of FIG. 1 or FIG. 2.

Referring to FIG. 11, in operation 1110, the electronic device according to an embodiment may determine whether the user first inserts the SIM card. The electronic device may include a slot capable of receiving a SIM card. The communication module of the electronic device (e.g., the communication module 190 of FIG. 1 or FIG. 2) may connect the electronic device to a network, based on a SIM card inserted into the slot. When the user inserts the SIM card, the electronic device may store the ID of the inserted SIM card. The electronic device may determine whether a SIM card different from the currently inserted SIM card has been inserted into the electronic device by using a counter related to the SIM card. If another SIM card has not been inserted into the electronic device in the past, the electronic device may determine the currently inserted SIM card as the first SIM card inserted by the user.

Referring to FIG. 11, in response to a SIM card first inserted into the electronic device, in operation 1120, the electronic device according to an embodiment may identify a first partition in which a backup file including all of at least one application installed in the electronic device is stored from among a plurality of partitions defined in a memory of the electronic device. The memory of the electronic device may correspond to the nonvolatile memory 134 of FIG. 1 or FIG. 2. The first partition may correspond to a partition on which an application is installed (e.g., the first partition 410 of FIGS. 4A to 4D). Even though the backup file is stored in the first partition reset by the factory data reset function, it may be set not to be removed by the factory data reset function. For example, the backup file may be set so that the backup file is not removed by the factory data reset function, based on the operation of FIGS. 5 to 6.

Referring to FIG. 11, in operation 1130, the electronic device according to an embodiment may store a backup file stored in the identified first partition in a second partition distinguished from the first partition among a plurality of partitions. Moving the backup file from the first partition to the second partition may be performed when the backup file is set not to be removed by the factory data reset function. The second partition may correspond to a partition (e.g., the second partition 420 of FIGS. 4A to 4D) in which cache data is stored. The second partition may be a partition that is not reset by a factory data reset function. The electronic device may perform the operation 1130 similar to that described in operation 320 of FIG. 3.

Referring to FIG. 11, after storing the backup file in the second partition, in operation 1140, the electronic device according to an embodiment may perform a factory data reset function. Based on the factory data reset function, the electronic device may remove all data included in the first partition. Since the second partition is a partition that is not reset by the factory data reset function, the backup file stored in the second partition may be maintained independently of the format of the first partition. The electronic device may perform an operation 1140 similar to that described in operation 330 of FIG. 3. After the factory data reset function is performed, the electronic device may be connected to the network based on the SIM card.

Referring to FIG. 11, after the factory data reset function is performed, in operation 1150, the electronic device according to an embodiment may restore the at least one application based on the second partition or the backup file stored in the first partition. For example, the electronic device may install at least one application included in the backup file into a partition (e.g., the first partition 410 of FIGS. 4A to 4D) in which applications is configured to be installed, as a partition reset by the factory data reset function. At least one application included in the backup file may be installed in the first partition in which the backup file is stored. The electronic device may perform an operation 1150 similar to that described in operation 340 of FIG. 3.

After restoring at least one application based on the backup file, the electronic device may move or copy the backup file stored in the second partition to the first partition. When moving or copying the backup file stored in the second partition to the first partition, the electronic device may store the backup file in a path other than a path that is not removed by the factory data reset function in the first partition (e.g., the designated path 620 in FIG. 6).

Referring to FIG. 11, after restoring at least one application based on the backup file, in operation 1160, the electronic device according to an embodiment may discard the backup file stored in the second partition or in the first partition. The electronic device may perform an operation 1160 similar to that described in operation 950 of FIG. 9.

When the backup file is moved or copied from the second partition to the first partition, the backup file is stored in a path that is not removed by the factory data reset function in the first partition, so that the electronic device may remove the backup file stored in the first partition without separate access rights.

Figure 12:
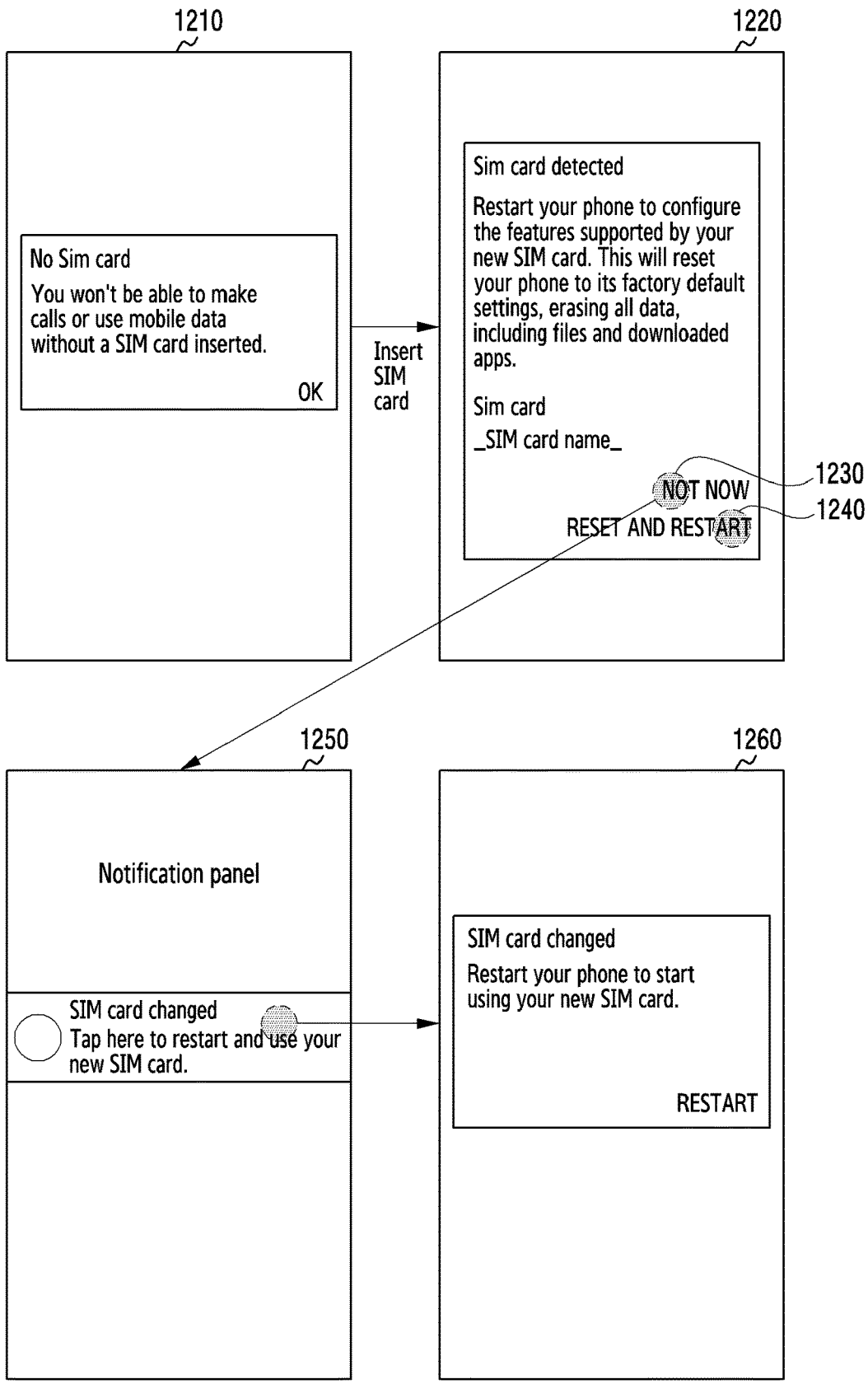
FIG. 12 is an exemplary diagram illustrating a user interface output to a user by an electronic device according to an embodiment in response to a SIM card inserted for the first time.

FIG. 12 is an exemplary diagram illustrating a user interface output to a user by an electronic device according to an embodiment in response to a SIM card inserted for the first time. The electronic device of FIG. 12 may correspond to the electronic device 101 of FIG. 1 or FIG. 2. The user interface illustrated in FIG. 12 may be output to a user through the display device 160 included in the electronic device 101 of FIG. 1 or FIG. 2.

Before the SIM card is inserted into the electronic device, the electronic device may output a first screen 1210 indicating absence of SIM card to the user. The first screen 1210 may include a message requesting the user to insert the SIM card or a message indicating that a network connection cannot be made before the SIM card is inserted. When the user inserts the SIM card into the slot of the electronic device, the electronic device may determine whether any SIM cards have been inserted into the electronic device before the inserted SIM card. For example, the electronic device may determine whether the user first inserts the SIM card, based on the operation 1110 of FIG. 11.

Referring to FIG. 12, in response to a SIM card first inserted into the electronic device, the electronic device may output a second screen 1220 to the user to identify whether the factory data reset function is executed. The electronic device may output one or more visual objects that cause the user to select whether to execute the factory data reset function on the second screen 1220. When the second screen 1220 is output in the display to which the touch sensor is coupled, the user may intuitively select whether to execute the factory data reset function by touching the visual object.

For example, when a user touches an area 1230 corresponding to a visual object that does not execute the factory data reset function in the second screen 1220, the electronic device may output a third screen 1250 notifying the user to reboot the electronic device without executing the factory data reset function. The electronic device may output information indicating establishment of a connection between the electronic device and the network, based on the inserted SIM card in the third screen 1250.

The electronic device may output a visual object that causes the user to initiate a reboot of the electronic device on the third screen 1250. When the user touches the visual object in the third screen 1250, the electronic device may output to the user a fourth screen 1260 for checking whether to reboot. When a user touches a visual object for checking whether to reboot on the fourth screen 1260, the electronic device may perform a reboot without executing a factory data reset function.

For example, when a user touches an area 1240 corresponding to a visual object that causes the factory data reset function to be executed in the second screen 1220, the electronic device may execute the factory data reset function. The electronic device may sequentially or simultaneously perform at least one of the operations after operation 1120 of FIG. 11. Before starting the factory data reset function, the electronic device may output a screen to the user to check whether the factory data reset function is executed, similar to the third screen 1250 or the fourth screen 1260.

As the electronic device performs the factory data reset function, among the data stored in the electronic device, data related to networks other than the network corresponding to the SIM card (e.g., among a plurality of networks that can be connected to the electronic device, networks other than the network corresponding to the SIM card) may be removed.

Figure 13:
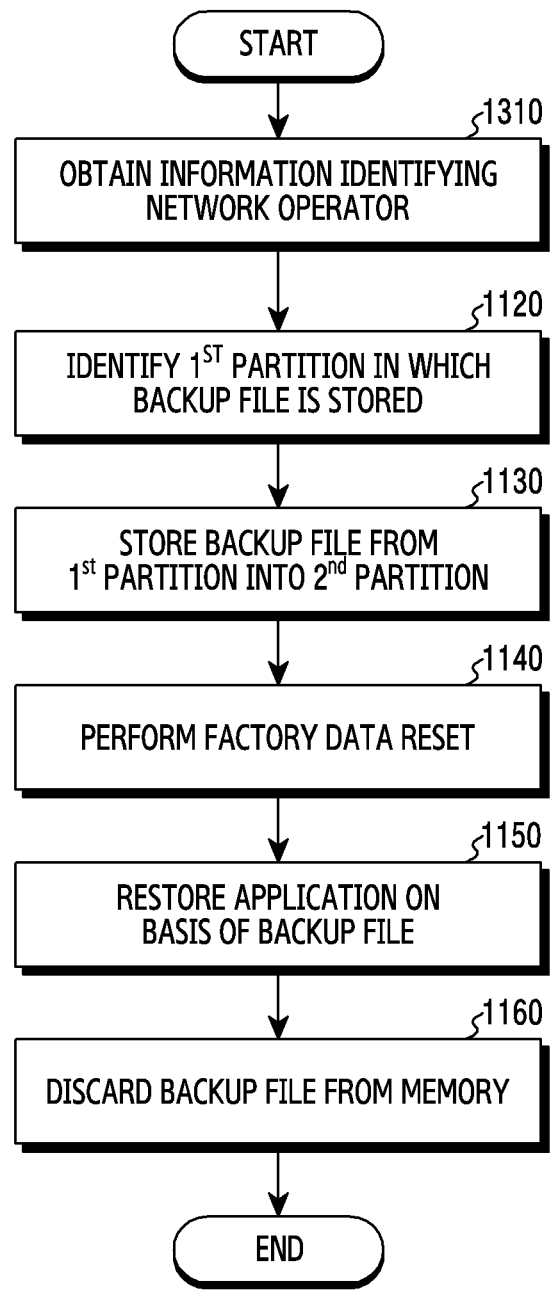
FIG. 13 is a flowchart illustrating an operation of performing a factory data reset function, based on network identification information initially input and restoring one or more applications removed by the factory data reset function by an electronic device according to another embodiment.

FIG. 13 is a flowchart illustrating an operation of performing a factory data reset function, based on network identification information initially input and restoring one or more applications removed by the factory data reset function by an electronic device according to another embodiment. The electronic device of FIG. 13 may correspond to the electronic device 101 of FIG. 1 or FIG. 2. The operation of FIG. 13 may be performed by the processor 120 included in the electronic device 101 of FIG. 1 or FIG. 2.

Referring to FIG. 13, in operation 1310, the electronic device according to another embodiment may obtain information for identifying an operator (or network operator) of a network to be connected to the electronic device from a user or a seller of the electronic device. For example, while a user purchases an electronic device, a seller of the electronic device may input information for identifying a network operator with the electronic device. The information for identifying an operator of a network or a network provider may include a service provider code.

When the electronic device is connected to the network based on the obtained information, the electronic device may execute a factory data reset function. Referring to FIG. 13, in response to obtaining the information, in operation 1120, an electronic device according to another embodiment may identify a first partition in which a backup file including at least one application installed in the electronic device is stored. The electronic device may perform operations after operation 1120 similar to operations 1120 to 1160 of FIG. 11.

As the electronic device performs the factory data reset function, data related to networks other than the network corresponding to the acquired information may be removed from the data stored in the electronic device. One or more applications installed in the electronic device may be preserved in the electronic device despite the execution of the factory data reset function by the backup file.

Figure 14:
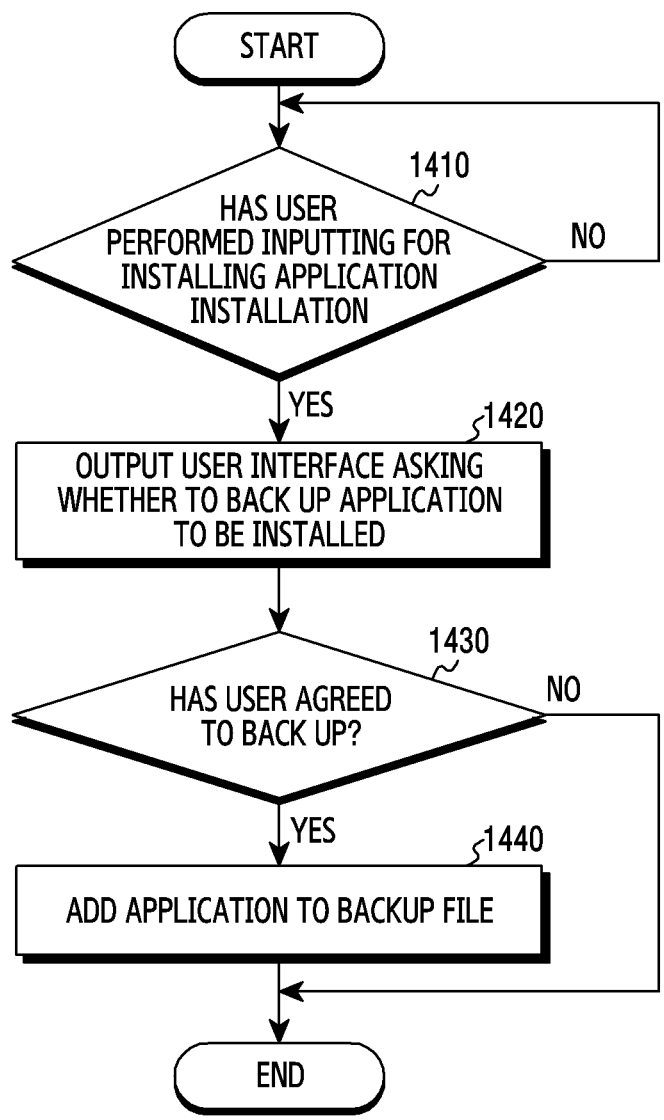
FIG. 14 is a flowchart illustrating an operation of adding an application to a backup file according to a user input by an electronic device according to various embodiments.

FIG. 14 is a flowchart illustrating an operation of adding an application to a backup file according to a user input by an electronic device according to various embodiments. The electronic device of FIG. 14 may correspond to the electronic device 101 of FIG. 1 or FIG. 2. The operation of FIG. 14 may be performed by the processor 120 included in the electronic device 101 of FIG. 1 or FIG. 2. The backup file may be provided by the manufacturer of the electronic device. The backup file may be generated, changed, or deleted by the user of the electronic device.

Referring to FIG. 14, in operation 1410, the electronic device according to various embodiments may determine whether a user has performed an input for installing an application. The user may download and install another application differentiated from a specific application from the network to the electronic device by using the specific application installed in the electronic device. For example, a user may identify a plurality of applications distributed through a network by using a specific application. The user may control the electronic device to install one or more applications on the electronic device from among a plurality of identified applications.

Referring to FIG. 14, when a user performs an input for installing an application, in operation 1420, the electronic device according to various embodiments may output a user interface asking whether to back up an application to be installed in the electronic device in response to the input.

The user may input, through the output user interface, whether or not to back up the application to be installed through the electronic device. A user interface asking whether to back up an application will be described in more detail with reference to FIG. 15.

Referring to FIG. 14, in operation 1430, the electronic device according to various embodiments may determine whether the user has consented to backup of an application to be installed. If the user disagrees with the backup of the application to be installed, the electronic device may install one or more applications selected by the user on the electronic device without changing or deleting the backup file.

When the user agrees to back up the application to be installed, in operation 1440, the electronic device according to various embodiments may add one or more applications selected by the user to the backup file. The backup file may correspond to the backup file 413 stored in the first partition 410 of FIG. 4A. Since the backup file is a file used for restoring applications after the factory data reset function is performed, one or more applications selected by the user and added to the backup file may be preserved in the electronic device despite the factory data reset function performed after operation 1440.

Figure 15:
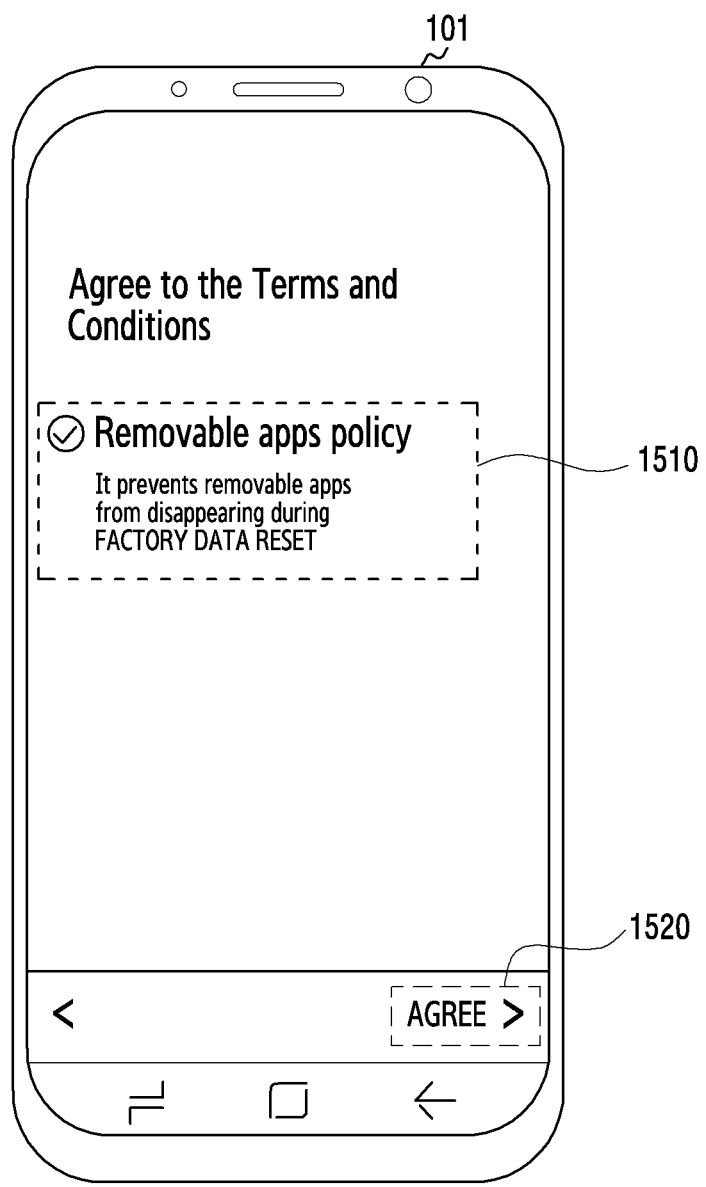
FIG. 15 is a diagram illustrating an example of a user interface output to a user by an electronic device according to various embodiments while performing the operation of FIG. 14.

FIG. 15 is a diagram illustrating an example of a user interface output to a user by an electronic device 101 according to various embodiments while performing the operation 1420 of FIG. 14. The electronic device of FIG. 15 may correspond to the electronic device 101 of FIG. 1 or FIG. 2. The operation of FIG. 15 may be performed by the processor 120 included in the electronic device 101 of FIG. 1 or FIG. 2.

The electronic device 101 may output the exemplary user interface of FIG. 15 to the user before installing one or more applications selected by the user on the electronic device 101. Referring to FIG. 15, the user interface output by the electronic device may include a visual object 1510 for receiving from the user whether to preserve one or more applications selected by the user from the factory data reset function. The user may input whether to preserve one or more applications selected by the user by touching the visual object 1510.

When a user touches a visual object 1510 to store one or more applications to be installed on the electronic device 101 and then touches a visual object 1520 for initiating installation of one or more applications, the electronic device 101 may add or merge one or more applications selected by the user to the backup file. For example, while downloading one or more applications, the electronic device 101 may add one or more downloaded applications to the backup file.

Figure 16:
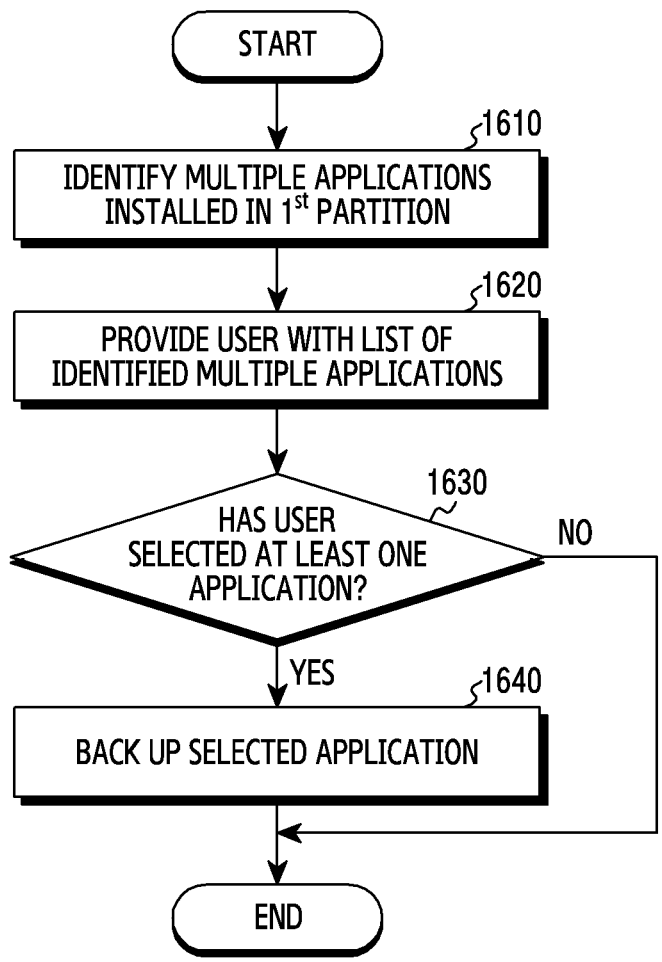
FIG. 16 is a flowchart illustrating an operation of backing up one or more applications to be preserved from a factory data reset function, based on user's selection by an electronic device according to various embodiments.

FIG. 16 is a flowchart illustrating an operation of backing up one or more applications to be preserved from a factory data reset function by an electronic device according to various embodiments. The electronic device of FIG. 16 may correspond to the electronic device 101 of FIG. 1 or FIG. 2. The operation of FIG. 16 may be performed by the processor 120 included in the electronic device 101 of FIG. 1 or FIG. 2. The backup file may be provided by the manufacturer of the electronic device. The backup file may be generated, changed, or deleted by the user of the electronic device.

Referring to FIG. 16, in operation 1610, the electronic device according to various embodiments may identify a plurality of applications installed in the first partition. Before performing the factory data reset function in response to a request for the factory data reset function, the electronic device may perform the operation 1610. The first partition is a partition defined in a nonvolatile memory (e.g., the nonvolatile memory 134 of FIG. 1 or FIG. 2) of an electronic device, and may be a partition defined to install a plurality of applications. For example, the first partition may correspond to the first partition 410 of FIGS. 4A to 4D. The plurality of applications installed in the first partition may include an application provided as a bundle together with an operating system, an application downloaded from a network by a user's input, and the like.

Referring to FIG. 16, in response to identification of the plurality of applications installed in the first partition, in operation 1620, the electronic device according to various embodiments may provide a list of the identified plurality of applications to the user. The list may be visually provided to the user through the display of the electronic device.

Referring to FIG. 16, in operation 1630, the electronic device according to various embodiments may determine whether a user has selected at least one application from the provided list. With respect to the operation 1620 or the operation 1630, a list provided to the user and an operation for selecting an application by the user will be described in more detail with reference to FIGS. 17A to 17B.

Referring to FIG. 16, when a user selects at least one application, in operation 1640, the electronic device according to various embodiments may back up at least one application selected by the user. In response to the selection of the at least one application by the user, the electronic device may add at least one selected application to the designated backup file (e.g., the backup file 413 stored in the first partition 410 of FIG. 4A). The backup file may include a file required for execution of an application, and data (e.g., log data, user preference) generated by an interaction between an application and a user.

Figure 17A:
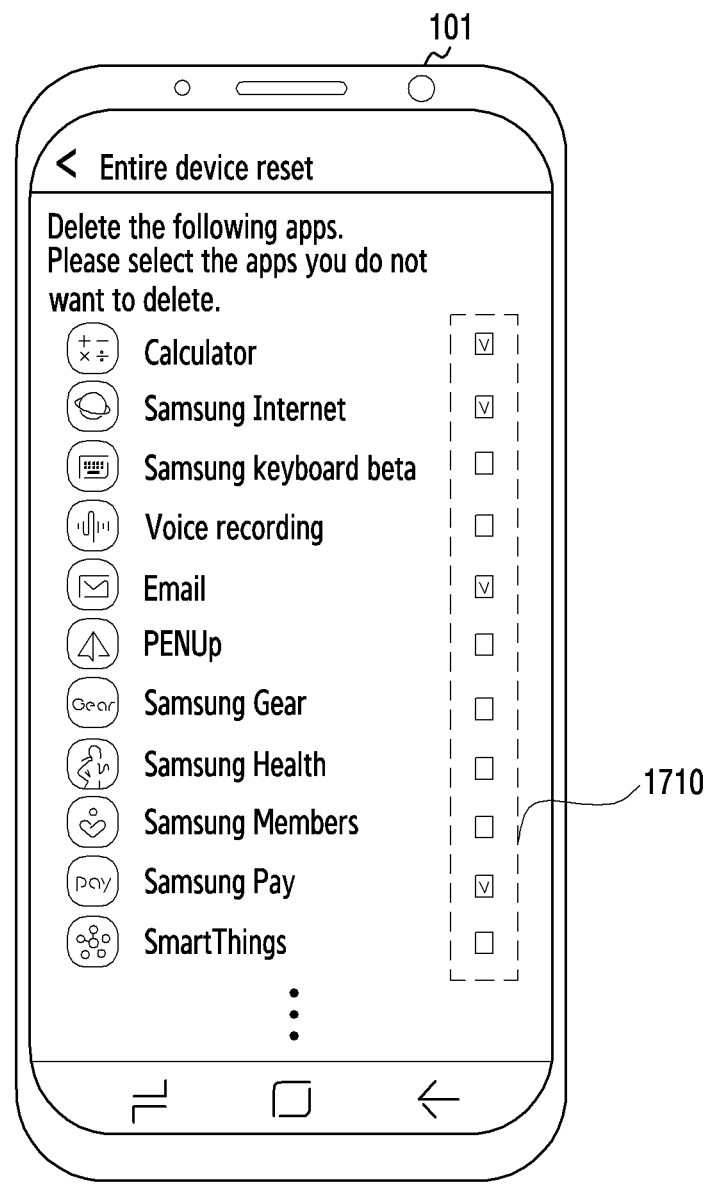
FIGS. 17A to 17B are diagrams illustrating an example of a user interface output to a user by an electronic device according to various embodiments in order to identify one or more applications to be preserved from a factory data reset function from a user.
Figure 17B:
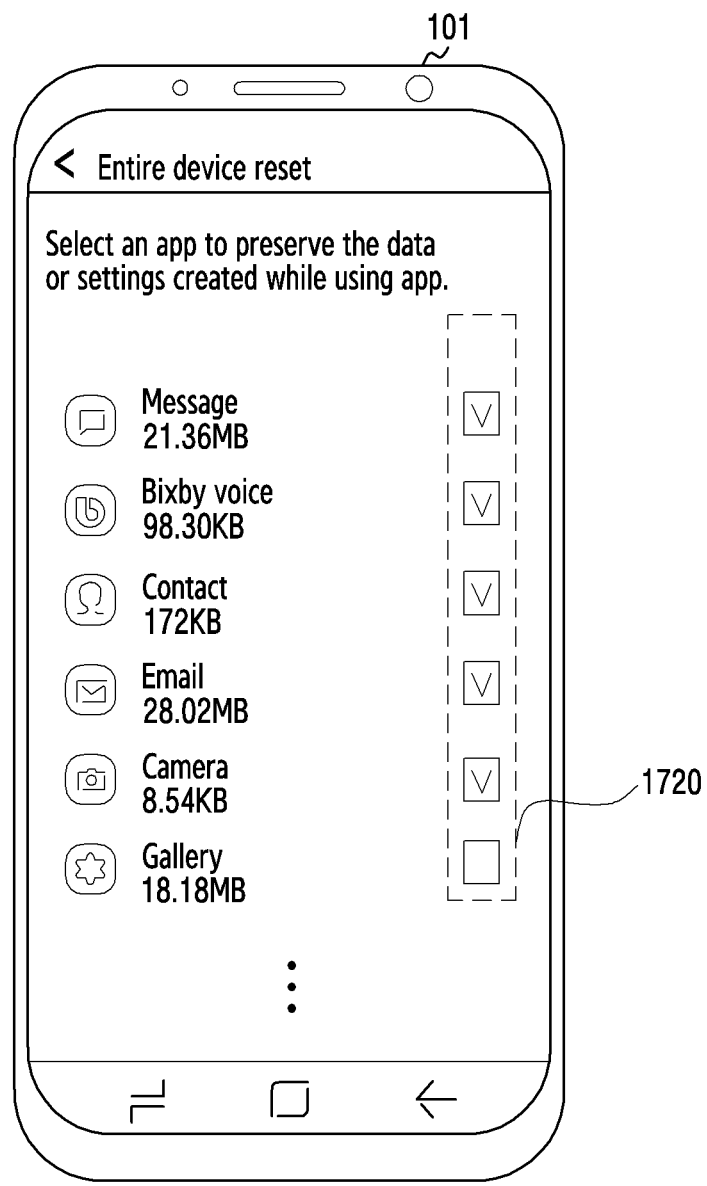

FIGS. 17A to 17B are diagrams illustrating an example of a user interface output to a user by an electronic device 101 according to various embodiments in order to identify one or more applications to be preserved from a factory data reset function from a user. The electronic device 101 of FIGS. 17A to 17B may correspond to the electronic device 101 of FIG. 1 or FIG. 2. The user interface of FIGS. 17A to 17B may be provided to a user by the processor 120 included in the electronic device 101 of FIG. 1 or FIG. 2. The electronic device 101 may output the user interface of FIGS. 17A to 17B to the user in response to a request for a factory data reset function or a user input for changing a setting of the factory data reset function.

Referring to FIG. 17A, an example of a user interface for backing up at least one of the one or more applications, including a list of one or more applications installed in the electronic device 101 is illustrated. The user interface may include one or more visual objects 1710 that correspond to each of the one or more applications and allow the user to select whether to add the corresponding application to the backup file. The user may select one or more visual objects 1710 and select one or more applications to be preserved from the factory data reset function.

In response to the selection of one or more visual objects 1710 by the user, the electronic device 101 may add one or more applications selected by the user to the backup file or may generate a backup file including one or more applications selected by the user. The backup file may be stored in an area within the memory that is not reset by the factory data reset function (e.g., the second partition 420 of FIGS. 4A to 4D or the designated path 620 of FIG. 6). The user interface of FIG. 17A and the backup file generated in response to a user's input to the user interface may be used to restore an application after the factory data reset function is performed, for example, based on the operation of FIG. 9.

Referring to FIG. 17B, another example of a user interface for backing up at least one of the one or more applications, including a list of one or more applications installed in the electronic device 101 is illustrated. Similar to FIG. 17A, the user interface of FIG. 17B may include a list of one or more applications installed in the electronic device 101. The electronic device 101 may determine whether to add an application to be included in the backup file and data generated during execution of the application to the backup file, based on the user interface of FIG. 17B. The data generated during execution of the application may include, for example, data generated from an interaction between the application and the user, a setting value of the application, and the like.

Referring to FIG. 17B, the user interface may correspond to each of one or more applications, and may include one or more visual objects 1720 that allow a user to select whether to add a corresponding application and data generated during execution of the application to a backup file. The electronic device 101 may add one or more applications and data generated during execution of the applications to the backup file based on the one or more visual objects 1720.

Figure 18:
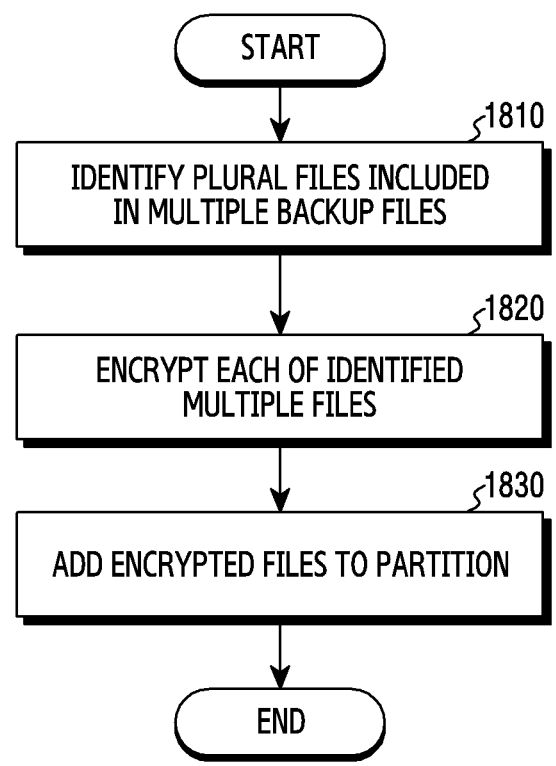
FIG. 18 is a flowchart illustrating an operation of encrypting one or more files included in each of one or more applications, based on a backup file including one or more applications, by an electronic device according to various embodiments.

FIG. 18 is a flowchart illustrating an operation of encrypting one or more files included in each of one or more applications, based on a backup file including one or more applications, by an electronic device according to various embodiments. The electronic device of FIG. 18 may correspond to the electronic device 101 of FIG. 1 or FIG. 2. The operations of FIG. 18 may be performed by the processor 120 included in the electronic device 101 of FIG. 1 or FIG. 2. The operations of FIG. 18 may be performed after the factory data reset function is performed. The operations of FIG. 18 may be related to at least one of operation 340 of FIG. 3, operation 920 of FIG. 9, and operation 1150 of FIG. 11, for example.

Referring to FIG. 18, in operation 1810, the electronic device according to various embodiments may identify a plurality of files included in the backup file. Each of the plurality of files included in the backup file may be associated with one or more applications backed up by the backup file.

Referring to FIG. 18, in operation 1820, the electronic device according to various embodiments may encrypt each of a plurality of identified files. For example, the electronic device may encrypt each of a plurality of identified files, based on a file-based encryption (FBE) function supported by the operating system.

Referring to FIG. 18, in operation 1830, the electronic device according to various embodiments may add each of a plurality of encrypted files to the partition. The partition to which each of the plurality of files is added may be a partition configured to install an application. For example, the partition to which each of the plurality of files is added may correspond to the first partition 410 of FIGS. 4A to 4D. As each of the plurality of encrypted files is added to the partition, one or more applications backed up by the backup file may be installed in the partition.

According to various embodiments, the electronic device may perform operations 1810 to 1830 using a backup file existing in a temporary space (e.g., a partition different from a partition set to install an application). In this case, the electronic device may perform operations 1810 to 1830 after activation of the FBE function supported by the operating system.

Figure 19:
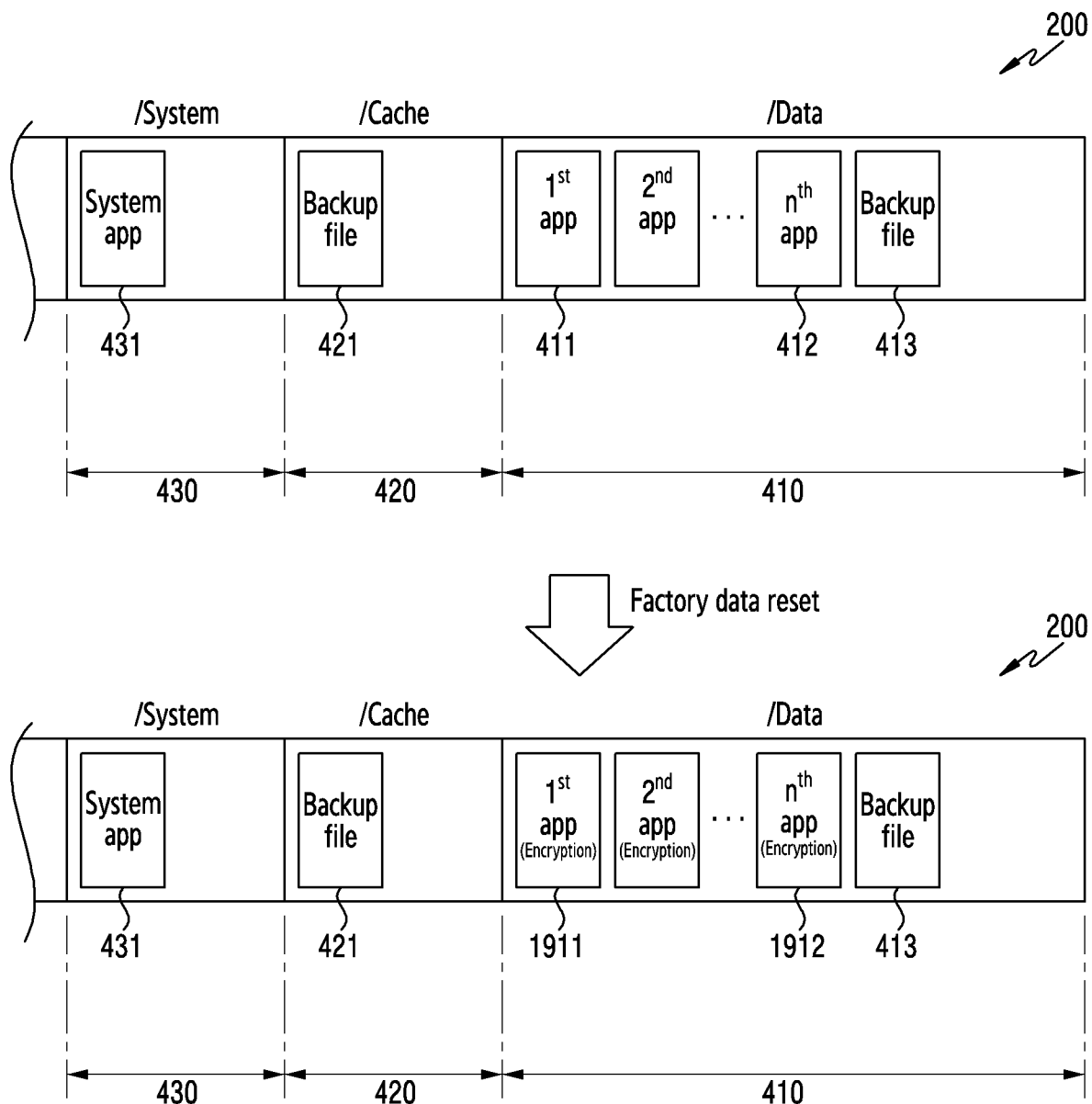
FIG. 19 is an exemplary diagram illustrating a change in data stored in each of N partitions stored in a memory of the electronic device while the electronic device according to various embodiments performs the operation of FIG. 18.

FIG. 19 is an exemplary diagram illustrating a change in data stored in each of N partitions 200 stored in a memory of the electronic device while the electronic device according to various embodiments performs the operation of FIG. 18. Each of a first partition 410, a second partition 420, and a third partition 430 of FIG. 19 may correspond to each of the first partition 410, the second partition 420, and the third partition 430 of FIGS. 4A to 4D.

Referring to FIG. 19, a backup file 413 and first to n$^{th}$ applications 411 to 412 may be stored in the first partition 410. The first to n$^{th}$ applications 411 to 412 may be installed in the first partition 410 by a manufacturer of the electronic device. In this case, a plurality of files included in each of the first to nth applications 411 to 412 may not be encrypted based on the file-based encryption function. For example, a plurality of files included in each of the first to nth applications 411 to 412 may be encrypted based on a partition-based encryption (PBE) function.

The electronic device according to various embodiments may perform a factory data reset function based on the operation of FIG. 3. In this case, the backup file 413 may be moved or copied from the first partition 410 to the second partition 420 before the factory data reset function is executed. After the first partition 410 is formatted by the factory data reset function, the electronic device may restore the first to nth applications 411 to 412 in the first partition 410, based on the backup file 413 that has been moved or copied to the second partition 420.

When restoring the first applications 411 to the nth applications 412 in the first partition 410, the electronic device may encrypt each of a plurality of files included in each of the first to nth applications 411 to 412, based on the operations of FIG. 18. Referring to FIG. 19, as the electronic device encrypts each of the files to be restored in the first partition 410 based on the operations of FIG. 18, the first to n$^{th}$ applications 1911 to 1912 may be installed in the first partition 410, based on the file-based encryption function. In this case, the process of malicious accessing the electronic device 101 (e.g., malware) may acquire contents of a plurality of files included in the first partition 410 when not only the encryption (e.g., partition-based encryption (PBE)) of the first partition 410 but also encryption (e.g., file-based encryption (FBE)) of each of the plurality of files included in the first partition 410 must be solved.

An electronic device according to various embodiments may install one or more applications installed in a partition, based on a backup file after the partition in which one or more applications are installed is reset by a factory data reset function. If the factory data reset function is not requested by the user who purchased the electronic device, for example, the inspector of the electronic device requests the factory data reset function, or the factory data reset function is requested based on the SIM card first inserted into the electronic device, restoration of one or more applications using the backup file may be performed by the electronic device.

The backup file may be protected from the factory data reset function by being stored in a partition not selectively reset by the factory data reset function or in a designated path in a partition in which one or more applications are installed. When the designated switches among a plurality of switches visible to the outside of the electronic device are simultaneously pressed during booting of the electronic device, the electronic device may perform an operation performed to protect the backup file from a factory data reset function (e.g., moving or copying the backup file to a designated path in the partition where one or more applications are installed, setting not to remove the backup file after performing the factory data reset function (e.g., setting the backup file not to be removed after initialization of the electronic device), etc.)

In order to prevent the backup file including one or more applications from reducing the usable capacity of the memory, the electronic device may discard the backup file from the memory after performing the restoration of one or more applications based on the backup file. Discarding the backup file from the memory by the electronic device may be performed after the user of the electronic device inputs information for identifying the user to the operating system initialized by the factory data reset function. For example, after performing the factory data reset function and restoring one or more applications are completed, the user may input the information to the operating system. The electronic device may discard the backup file from the memory after completing the initialization of the operating system in response to the information (e.g., at the time of displaying the home screen).

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being

The invention claimed is:

1. An electronic device comprising:
a user interface;
a plurality of switches each respectively assigned a function and provided as a plurality of hardware buttons;
a memory including at least one application, a first partition including a backup file obtained by compressing the application, and a second partition distinguished from the first partition; and
a processor electrically connected to the user interface and the memory,
wherein the memory stores instructions that allow the processor to:
while the electronic device is in a power-on state, receive a first input requesting a factory data reset through the plurality of switches, wherein the first input is a simultaneous input to designated buttons among the plurality of hardware buttons;
move the backup file to the second partition in response to the simultaneous input for the designated buttons;
delete data in the first partition after the movement; and
install the at least one application on the first partition by using the backup file, while the electronic device is rebooting.

2. The electronic device of claim 1, wherein the instructions allow the processor to:
receive a second input via the user interface while the electronic device is rebooting; and
prohibit reading and writing of the backup file in response to the second input.

3. The electronic device of claim 2, wherein the user interface further includes at least one hardware button.

4. The electronic device of claim 2, wherein the instructions allow the processor to release the read and write prohibition of the backup file after receiving the first input.

5. The electronic device of claim 4, wherein the user interface further includes a display, and wherein the instructions allow the processor to delete the backup file after a home screen is displayed on the display.

6. The electronic device of claim 2, wherein the user interface further includes a touch screen display, and wherein the instructions allow the processor to receive the second input through the touch screen display.

7. The electronic device of claim 1, wherein the instructions allow the processor to delete data by formatting the first partition when the factory data reset is in progress.

8. A method of an electronic device including a plurality of switches each assigned a function and provided as a plurality of hardware buttons, the method comprising:
while the electronic device is in a power-on state, receiving an input requesting a factory data reset through the plurality of switches, wherein the input is a simultaneous input to designated buttons among the plurality of hardware buttons;
performing factory data reset while at least one application and a first file are stored in a memory of the electronic device in response to the simultaneous input for the designated buttons, the first file being maintained in the memory independently of the factory data reset, and the at least one application being discarded in the memory in response to performing the factory data reset;
restoring the at least one application by using the first file maintained in the memory after completion of the factory data reset; and
discarding the first file in the memory in response to detection of a designated input after restoration of the at least one application is completed.

9. The method of claim 8, wherein the designated input is obtained from a user of the electronic device and is an input for registering the user with an operating system running on the electronic device.

10. The method of claim 9, further comprising:
providing a first user interface for obtaining the designated input to the user in response to restoration of the at least one application; and
providing the user with a second user interface for executing at least a portion of the restored at least one application, based on the designated input and the user's selection in response to detection of the designated input through the first user interface.

11. The method of claim 8, wherein the first file is a file in which the at least one application stored in the memory is merged, and is stored in a first partition in which the at least one application is installed among a plurality of partitions defined in the memory.

12. The method of claim 11, wherein the performing the factory data reset comprises storing a second file corresponding to the first file in a second partition distinguished from the first partition before the first partition is formatted in response to performing the factory data reset, and
wherein the second partition is configured to maintain a second file stored in the second partition independent of the factory data reset.

13. The method of claim 12, wherein the restoring of the at least one application further comprises restoring the first file in the first partition based on the second file stored in the second partition after restoration of the at least one application is completed.

14. The method of claim 8, wherein the electronic device further comprises a slot capable of accommodating a subscriber identification module (SIM) card and a communication circuit configured to connect the electronic device to a network based on a SIM card inserted into the slot, and
wherein the performing the factory data reset is performed in response to first inserting a SIM card into the slot.

15. The method of claim 8, wherein the electronic device further comprises a communication circuit configured to connect the electronic device to a network, and
wherein the performing the factory data reset is performed in response to detection of an input for identifying a network to be connected by the communication circuit.

16. The method of claim 8, wherein the memory configured to preserving data stored in the memory in response to the electronic device not receiving power.

* * * * *